(12) United States Patent
Lawrence et al.

(10) Patent No.: US 11,695,337 B2
(45) Date of Patent: *Jul. 4, 2023

(54) CURRENT CONTROL FOR A BOOST CONVERTER WITH DUAL ANTI-WOUND INDUCTOR

(71) Applicant: Cirrus Logic International Semiconductor Ltd., Edinburgh (GB)

(72) Inventors: Jason W. Lawrence, Austin, TX (US); John L. Melanson, Austin, TX (US); Eric J. King, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/525,463

(22) Filed: Nov. 12, 2021

(65) Prior Publication Data

US 2022/0069702 A1 Mar. 3, 2022

Related U.S. Application Data

(63) Continuation-in-part of application No. 16/709,036, filed on Dec. 10, 2019, now Pat. No. 11,476,759.

(Continued)

(51) Int. Cl.
 *H02M 3/155* (2006.01)
(52) U.S. Cl.
 CPC .................................. *H02M 3/155* (2013.01)
(58) Field of Classification Search
 CPC ........ H02M 3/155; H02M 3/158; H02M 1/40; H02M 1/0009
 See application file for complete search history.

(56) References Cited

U.S. PATENT DOCUMENTS 3,920,925 A * 11/1975 Lindow ..................... H02J 1/06
 322/15
5,510,974 A 4/1996 Gu et al.
(Continued)

FOREIGN PATENT DOCUMENTS

CN 105119487 A 12/2015
DE 102016120221 A1 6/2017
(Continued)

OTHER PUBLICATIONS

Forsyth, Andrew J. et al., Sampled-Data Analysis of the Dual-Interleaved Boost Converter with Interphase Transformer, IEEE Transactions on Power Electronics, vol. 27, No. 3, Mar. 2012, pp. 1338-1346.

(Continued)

*Primary Examiner* — Adolf D Berhane
(74) *Attorney, Agent, or Firm* — Jackson Walker L.L.P.

(57) ABSTRACT

A system may include a power converter comprising at least one stage having a dual anti-wound inductor having a first winding and a second winding constructed such that its windings generate opposing magnetic fields in its magnetic core and constructed such that a coupling coefficient between the first winding and the second winding is less than approximately 0.95 and a current control subsystem for controlling an electrical current through the dual anti-wound inductor, the current control subsystem configured to minimize a magnitude of a magnetizing electrical current of the dual anti-wound inductor to prevent core saturation of the dual anti-wound inductor and regulate an amount of output electrical current delivered by the power converter to the load in accordance with a reference input signal.

24 Claims, 24 Drawing Sheets

Related U.S. Application Data

(60) Provisional application No. 62/783,547, filed on Dec. 21, 2018.

(56) References Cited

U.S. PATENT DOCUMENTS

| | | | |
|---|---|---|---|
| 7,423,520 B2 * | 9/2008 | Wasaki | H03H 7/09 |
| | | | 340/12.34 |
| 8,513,854 B1 * | 8/2013 | Nerone | F04D 33/00 |
| | | | 310/317 |
| 9,691,538 B1 | 6/2017 | Ikriannikov et al. | |
| 10,020,109 B1 | 7/2018 | Ikriannikov | |
| 10,516,337 B2 | 12/2019 | Ojika et al. | |
| 10,917,013 B2 | 2/2021 | Melanson et al. | |
| 11,476,759 B2 * | 10/2022 | Lawrence | H02M 1/40 |
| 2005/0040800 A1 | 2/2005 | Sutardja | |
| 2006/0103359 A1 | 5/2006 | Watanabe et al. | |
| 2007/0090915 A1 | 4/2007 | Zhou et al. | |
| 2008/0266042 A1 | 10/2008 | Yoshimura et al. | |
| 2010/0195361 A1 | 8/2010 | Stem | |
| 2011/0025289 A1 | 3/2011 | Wang et al. | |
| 2012/0319478 A1 | 12/2012 | Gentchev et al. | |
| 2014/0016371 A1 | 1/2014 | Chandrasekaran | |
| 2014/0185328 A1 | 7/2014 | Rosado et al. | |
| 2015/0365005 A1 | 12/2015 | Panov et al. | |
| 2016/0359411 A1 | 12/2016 | Ihs | |
| 2017/0085189 A1 | 3/2017 | Madsen | |
| 2019/0149049 A1 | 5/2019 | Tashiro et al. | |

FOREIGN PATENT DOCUMENTS

| | | |
|---|---|---|
| EP | 1808952 A2 | 7/2007 |
| EP | 2506413 A2 | 10/2012 |
| WO | 2015037204 A1 | 3/2015 |

OTHER PUBLICATIONS

Le Bolloch, Mathieu et al., Current-Sharing Control Technique for Interleaving VRMs using Intercell Transformers, 2009 13th European Conference on Power Electronics nad Applications, Sep. 8-10, 2009, Barcelona, ES.

OGATA Katsuhiko, Discrete-Time Control Systems, Prentice Hall, 1995, pp. 377-517.

Simon, Dan, Optimal State Estimation, Wiley 2006: pp. 123-145 (Chapter 5).

Erickson, Robert W. and Maksimociv, D., Fundamentals of Power Electronics: Second Edition, Springer Science +Business Media, 2001: pp. 213-226 (Chapter 7.3).

International Search Report and Written Opinion of the International Searching Authority, International Application No. PCT/US2019/067241, dated Mar. 30, 2020.

International Search Report and Written Opinion of the International Searching Authority, International Application No. PCT/US2019/066778, dated Mar. 19, 2020.

First Office Action, China National Intellectual Property Administration, Application No. 201980092817.7, dated Dec. 10, 2021.

International Search Report and Written Opinion of the International Searching Authority, International Application No. PCT/US2022/049428, dated Feb. 17, 2023.

* cited by examiner

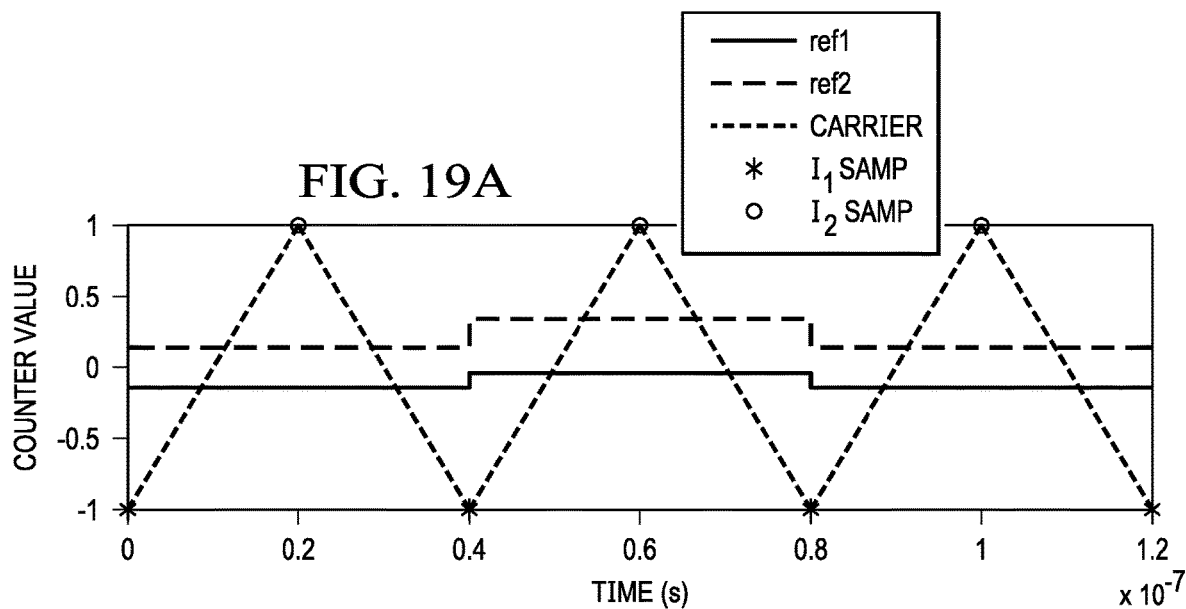
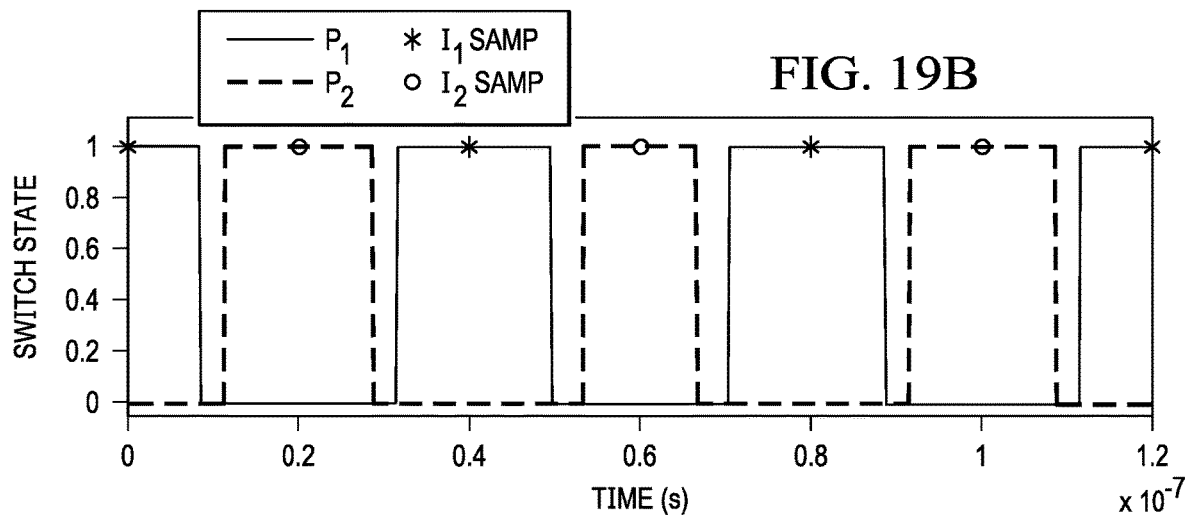

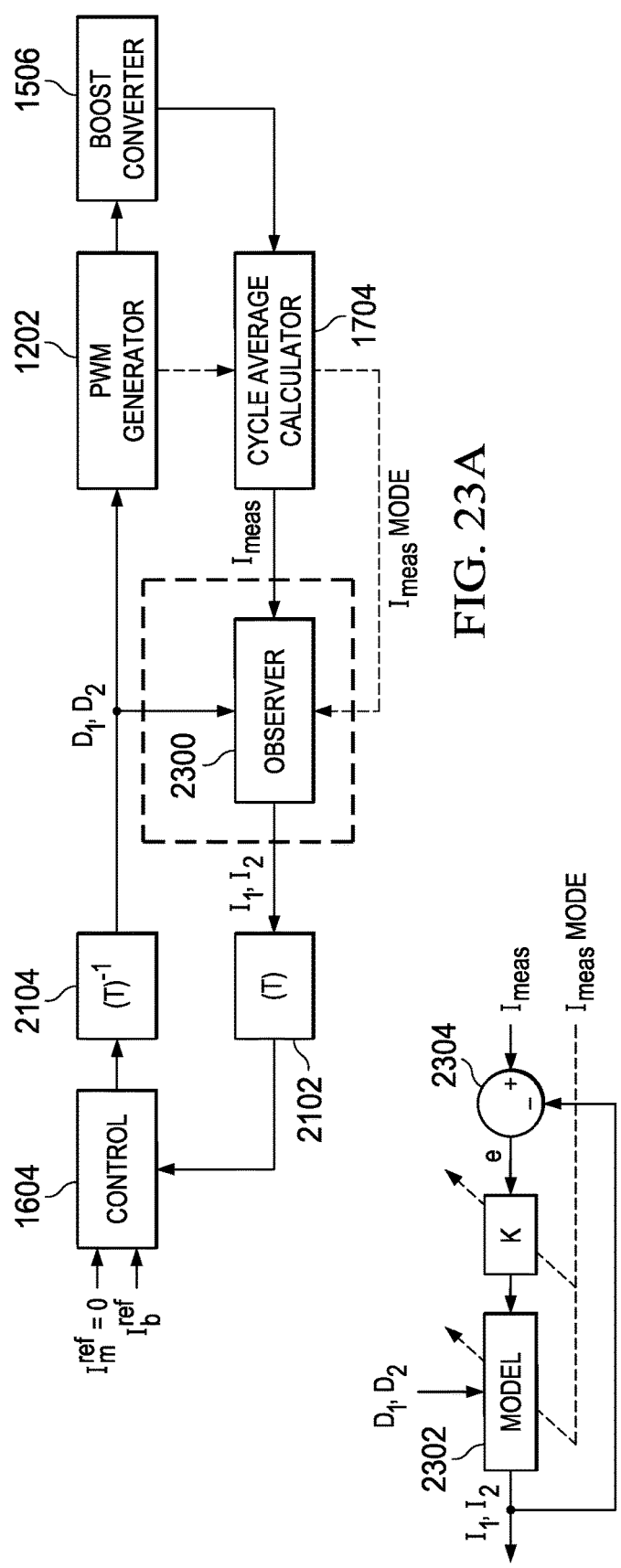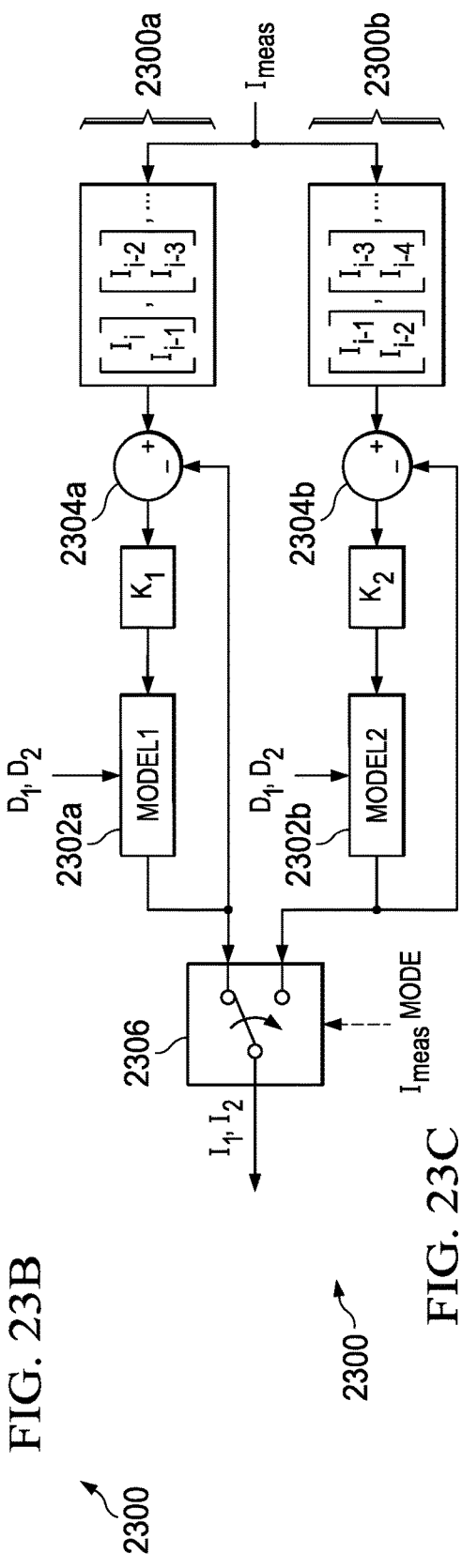
FIG. 23A
FIG. 23B
FIG. 23C

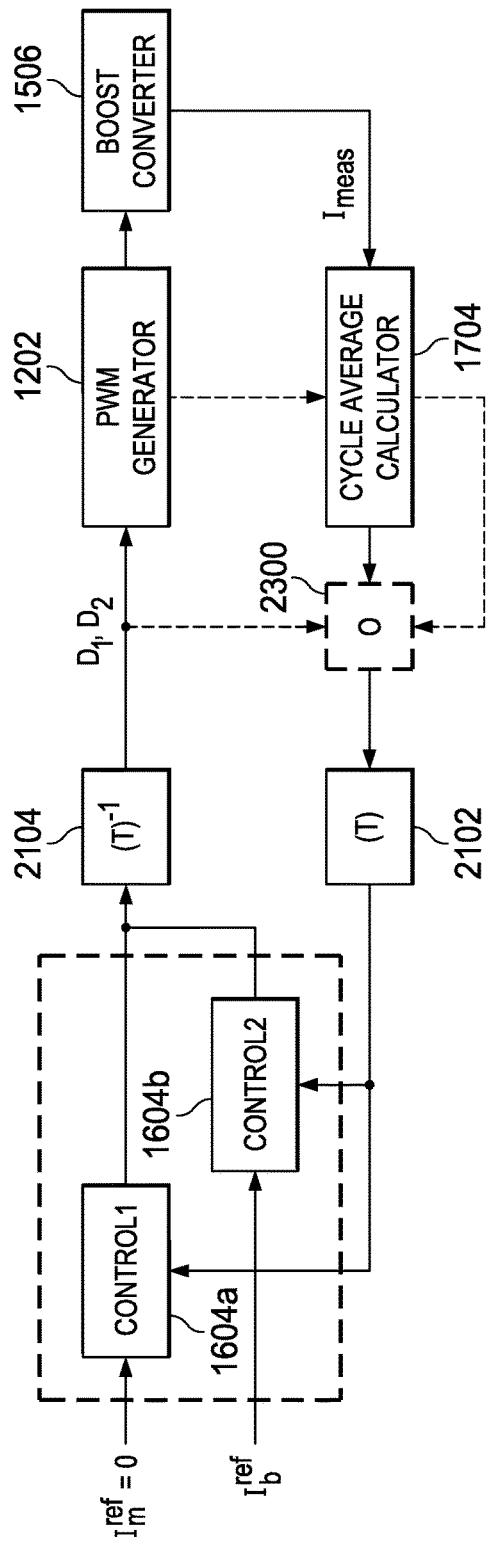
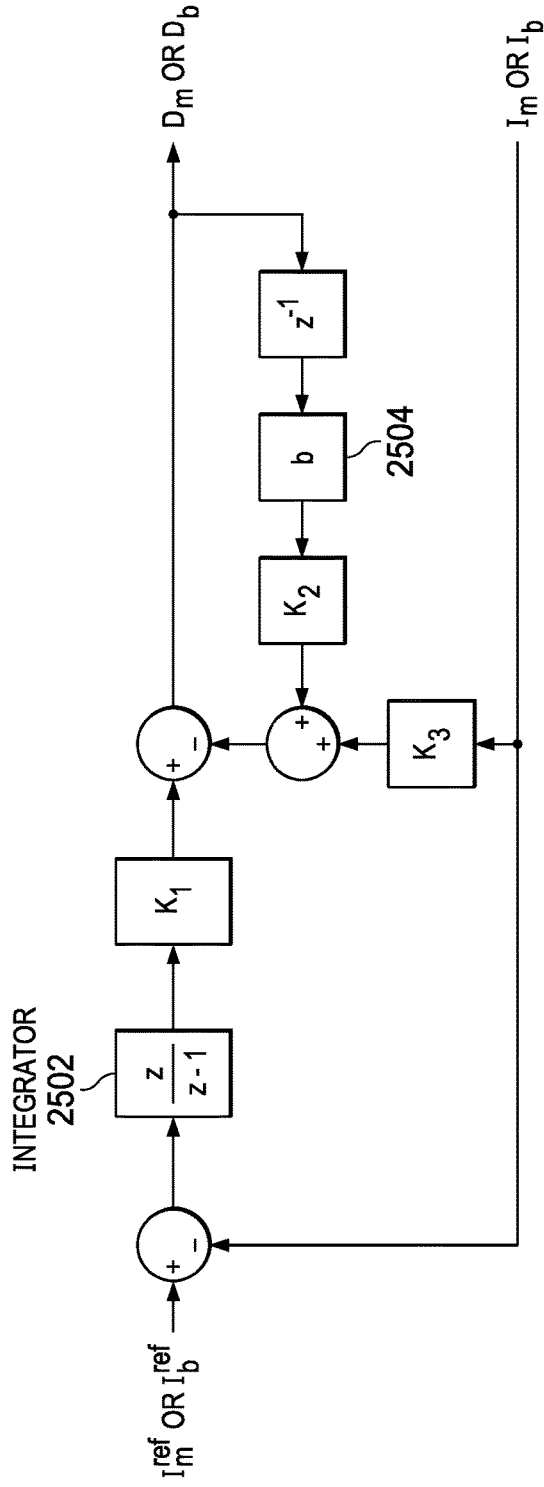
FIG. 25A
FIG. 25B

CURRENT CONTROL FOR A BOOST CONVERTER WITH DUAL ANTI-WOUND INDUCTOR

RELATED APPLICATION

The present disclosure claims priority as a continuation-in-part application to U.S. Provisional patent application Ser. No. 16/709,036, filed Dec. 10, 2019, which in turn claims priority to U.S. Provisional Patent Application Ser. No. 62/783,547, filed Dec. 21, 2018, both of which are incorporated by reference herein in their entireties.

FIELD OF DISCLOSURE

The present disclosure relates in general to circuits for audio devices, piezoelectric devices, haptic-feedback devices, and/or other devices, including without limitation personal audio devices such as wireless telephones and media players, and more specifically, to an augmented multi-stage boost converter that may be used in such devices.

BACKGROUND

Personal audio devices, including wireless telephones, such as mobile/cellular telephones, cordless telephones, mp3 players, and other consumer audio devices, are in widespread use. Such personal audio devices may include circuitry for driving a pair of headphones, one or more speakers, a piezoelectric transducer, a haptic feedback transducer, and/or other transducer. Such circuitry often includes a driver including a power amplifier for driving a transducer output signal to the transducer. Oftentimes, a power converter may be used to provide a supply voltage to a power amplifier in order to amplify a signal driven to speakers, headphones, piezoelectric transducers, haptic feedback transducers, or other transducers. A switching power converter is a type of electronic circuit that converts a source of power from one direct current (DC) voltage level to another DC voltage level. Examples of such switching DC-DC converters include but are not limited to a boost converter, a buck converter, a buck-boost converter, an inverting buck-boost converter, and other types of switching DC-DC converters. Thus, using a power converter, a DC voltage such as that provided by a battery may be converted to another DC voltage used to power the power amplifier.

Battery-powered systems may use a boost converter to generate a power supply for an audio amplifier that is greater than a voltage of the battery. For example, a motivation for using a boost converter in a battery-powered transducer is to generate a greater signal swing at the output of a transducer amplifier than could be achieved by powering the amplifier directly from the battery.

Traditionally, while a boost converter and an amplifier powered from the boost converter are often manufactured on the same integrated circuit, boost converters often require a boost inductor external to the integrated circuit, which requires significant space. However, recent advances in manufacturing have enabled the integration of inductors with a magnetic core into an integrated circuit die. Advantages of an integrated inductor may include smaller total circuit area, significant reduction in height in a direction perpendicular to a surface of the integrated circuit, lower electromagnetic interference emissions, and less variation of inductor physical properties.

Despite the advances in inductor manufacturing, designing a boost converter with an integrated inductor may be challenging. External boost converter inductors for audio applications generally have inductances between 1 µH and 2 µH and saturate at between 2.5 A and 4 A of current. However, a typical integrated inductor may have an inductance in the range of tens to hundreds of nanohenries with a current saturation limit at or less than 1 A. A typical boost converter for audio may supply 12V into a 10 W load from a 4V battery supply. Thus, even assuming 100% efficiency, a standard boost converter design may draw 2.5 A input current, which is well beyond the saturation point of the integrated inductor. A multi-phase converter could be used to distribute the current to multiple inductors, but the small inductance causes a large current ripple that may still exceed the saturation constraint.

To use an integrated inductor, the design of a power converter must overcome the limitations of its low inductance and low saturation current. One solution to this problem is to use a multi-wound inductor with a modified boost converter architecture.

A multi-wound inductor may be used to weaken the magnetic field in the core and prevent early saturation. FIG. 1A depicts a multi-wound inductor 100 with two coils 102a and 102b wrapped around a common magnetic core 104. FIG. 1B depicts a cross-sectional side view of inductor 100 depicting current flow in each of coils 102a and 102b, with "·" depicting a current $I_1$ flowing out of the page in a direction perpendicular to the plane of the page and with "X" depicting a current $I_2$ flowing into the page in a direction perpendicular to the plane of the page. Coils 102a and 102b may be wound in opposite directions such that positive current generates opposite fields in each coil. Therefore, a total magnetic flux $\Phi_M$ through magnetic core 104 may equal the difference between the magnetic flux $\Phi_{M1}$ from coil 102a and the magnetic flux $\Phi_{M2}$ from coil 102b. Magnetic fluxes $\Phi_{M1}$, $\Phi_{M2}$, in coil 102a, 102b may be proportional to currents $I_1$ and $I_2$, respectively, in such coil 102a, 102b.

Inductor 100 may saturate when the magnetic field in magnetic core 104 exceeds a threshold, $B_{sat}$. The magnetic field may be proportional to the total magnetic flux $\Phi_M$ in magnetic core 104, which may therefore be proportional to the difference in currents (e.g., $I_1-I_2$). As a result, a saturation constraint for inductor 100 may be given as:

$$I_{diff}^{sat} \geq |I_1 - I_2| \qquad (1)$$

where $I_{diff}^{sat}$ is a difference between current $I_1$ and current $I_2$ that saturates inductor 100 and may typically be around 0.5 A-1.0 A for an integrated inductor. Equation (1) above may only be valid for low to moderate levels of current. FIG. 1C illustrates a saturation profile of current $I_2$ versus current $I_1$. Dashed lines depict saturation boundaries 108 from equation (1) whereas the hatched region depicts the true saturation region 110 defined by the boundary ABCDE. For low currents, the unsaturated region 112 is a strip along the main diagonal as described by equation (1). However, at larger currents the unsaturated region 112 shrinks in width until, at very large currents, inductor 100 is always saturated. This effect may occur because the field cancellation between coils 102a and 102b may not be perfect, especially at their respective ends. Also, some inductor designs may use extra turns of one of coils 102a, 102b to control a coupling coefficient which may further reduce the field cancellation. As a result, inductor 100 may saturate even though the current difference $|I_1-I_2|$ is within its limits. Thus, the condition of equation (1) may represent a necessary (but not a sufficient) condition for saturation. Instead, a sufficient condition for inductor 100 to be unsaturated is that currents $I_1$ and $I_2$ must lie in unsaturated region 112 defined by points ABCDE.

A multi-wound inductor may extend the range of winding currents that may be used before the device is saturated. For example, if current $I_2$ is zero, current $I_1$ may only extend to point E in FIG. 1C and remain unsaturated. However, with a properly chosen value for current $I_2$, the range of current $I_1$ can be extended to point D or even point C and remain unsaturated due to the field cancellation of currents $I_1$ and $I_2$. This range extension can be used to help with the saturation problem of integrated boost inductors. However, the boost architecture must also be designed to take advantage of the benefits of a multi-wound inductor.

FIG. 2 depicts one example of a single-stage boost converter 200 that may be used with a multi-wound inductor 100 and having a load 202. Single-stage boost converter 200 may use capacitor 204 to stabilize its output voltage $V_{out}$. A battery 206 may supply single-stage boost converter 200 with an input voltage $V_{in}$. Single-stage boost converter 200 may comprise a plurality of switches 210, 212, 214, and 216, each switch having a gate G to receive a control signal to control the conductivity of such switch (e.g., to selectively open and close such switch). Such control signals may comprise pulse-width modulation control signals labeled $P_1$ and $P_2$ in FIG. 2, along with their respectively logical complements, signals labeled $\overline{P_1}$ and $\overline{P_2}$ in FIG. 2. Switches 210 and 212 may toggle top coil 102a of inductor 100 between a charging state in which coil 102a is coupled between battery 206 and ground and a transfer state wherein coil 102a is coupled between power supply 206 and load 202. Likewise, switches 214 and 216 may toggle bottom coil 102b of inductor 100 between a charging state in which coil 102b is coupled between battery 206 and ground and a transfer state wherein coil 102b is coupled between power supply 206 and load 202. The boost voltage ratio, $V_{out}/V_{in}$, may be related to the pulse-width modulation duty cycle D of control signals $P_1$ and $P_2$ with an equation that is very similar to that of a standard boost converter:

$$\frac{V_{out}}{V_{in}} = \frac{1}{1-D} \quad (2)$$

assuming no inductor or switching losses.

Single-stage boost converter 200 depicted in FIG. 2 may not prevent the multi-wound inductor from saturating at realistic boost voltages and output powers. For example, FIG. 3A depicts a circuit simulation of currents $I_1$ and $I_2$ for single-stage boost converter 200 over one pulse-width modulation cycle, with an output voltage $V_{Out}$ of 12 V, an output power of 10 W, and an input voltage $V_{in}$ of 4 V, which may represent standard nominal operation conditions for a boost converter in an audio application. The simulation results as depicted in FIG. 3A also model resistive losses in switches 210, 212, 214, and 216 and inductor 100. FIG. 3B depicts current difference $I_1-I_2$ and saturation level $I_{diff}^{sat}$ for inductor 100. FIG. 3C depicts currents $I_2$ versus $I_1$ on a plot along with the saturation boundary $I^{sat}$ also plotted in FIG. 3C, showing that although current difference $I_1-I_2$ remained below saturation level $I_{diff}^{sat}$ in FIG. 3B, their individual amplitudes exceeded saturation boundary $I^{sat}$ in FIG. 3C. Accordingly, single-stage boost converter 200 may not be useful for a desired application.

FIG. 4 depicts one example of a two-stage boost converter 400 that may be used with multi-wound inductor 100 and having a load 202. Each stage 401a, 401b of two-stage boost converter 400 may be identical to single-stage boost converter 200 shown in FIG. 2, and stages 401a, 401b may be coupled in series. One disadvantage to two-stage boost converter 400 is that it requires two capacitors, 204 and 205, to stabilize the output of each stage 401 compared to the single capacitor 204 required for single-stage converter 200. Both capacitors 204 and 205 may be large and may contribute significantly to the total circuit area.

In the architecture of two-stage boost converter 400, the boosted output of first stage 401a supplies the input voltage to second stage 401b. Therefore, the total boost ratio of both stages 401 is the product of the boost ratio of each stage 401a, 401b. Because both stages 401a, 401b may operate with identical duty cycles, the total boost ratio of two-stage boost converter 400 may be given as:

$$\frac{V_{out}}{V_{in}} = \left(\frac{1}{1-D}\right)^2 \quad (3)$$

assuming no inductor or switching losses. Comparing equation (3) with equation (2), two-stage boost converter 400 may require a lower duty cycle than single-stage boost converter 200 to achieve the same boost voltage ratio. For example, to boost from 4V to 12V, single-stage boost converter 200 may require a duty cycle of 0.67 versus 0.42 for the two-stage boost converter 400. A lower duty cycle may decrease the magnitude of the current ripple, which should help prevent saturation.

FIG. 5A depicts a circuit simulation of currents $I_{1-STAGE1}$, $I_{2-STAGE1}$, $I_{1-STAGE2}$, and $I_{2-STAGE2}$ for two-stage boost converter 400 over one pulse-width modulation cycle. A comparison of FIG. 5A with FIG. 3A shows that coil current ripple amplitude may be significantly reduced. FIG. 5B depicts current difference $I_{1-STAGE1}-I_{2-STAGE1}$, current difference $I_{1-STAGE2}-I_{2-STAGE2}$, and saturation level $I_{diff}^{sat}$ for inductors 100. FIG. 5C depicts currents $I_{2-STAGE1}$ versus $I_{1-STAGE1}$ and currents $I_{2-STAGE2}$ versus $I_{1-STAGE2}$ on a plot along with the saturation boundary $I^{sat}$ also plotted in FIG. 5C. In comparing FIGS. 5B and 5C to FIGS. 3A and 3B, respectively, the over-saturation issues of single-stage boost converter 200 are shown to be greatly improved. The currents of inductor 100 of first stage 401a may now be within saturation limits. However, the currents of inductor 100 of second stage 401b may still exceed saturation limits. The problem with two-stage boost converter 400 may be that even though the duty cycle is smaller, second stage 401b is sourced from the output of first stage 401a, which is at a higher voltage than voltage Vi, of battery 206. Therefore, inductor 100 of second stage 401b may experience a larger voltage drop when control signal $P_1$ is asserted, and that may cause the large current difference $I_{1-STAGE2}-I_{2-STAGE2}$ shown in FIG. 5B.

Thus, neither single-stage boost converter 200 nor two-stage boost converter 400 may satisfy the saturation constraints of inductor 100 for desired applications.

By including discussion in this Background section, Applicant is making no admission that any of the content of this Background section is prior art that may be used to support a prior-art based rejection of the recited claims.

SUMMARY

In accordance with the teachings of the present disclosure, one or more disadvantages and problems associated with existing inductor-based power converters may be reduced or eliminated.

In accordance with embodiments of the present disclosure, a system may include a power converter comprising at least one stage having a dual anti-wound inductor having a first winding and a second winding constructed such that its windings generate opposing magnetic fields in its magnetic core and constructed such that a coupling coefficient between the first winding and the second winding is less than approximately 0.95 and a current control subsystem for controlling an electrical current through the dual anti-wound inductor, the current control subsystem configured to minimize a magnitude of a magnetizing electrical current of the dual anti-wound inductor to prevent core saturation of the dual anti-wound inductor and regulate an amount of output electrical current delivered by the power converter to the load in accordance with a reference input signal.

In accordance with these and other embodiments of the present disclosure, a method may be provided for controlling an electrical current through a dual anti-wound inductor integral to a power converter, the dual anti-wound inductor having a first winding and a second winding constructed such that its windings generate opposing magnetic fields in its magnetic core and constructed such that a coupling coefficient between the first winding and the second winding is less than approximately 0.95. The method may include minimizing a magnitude of a magnetizing electrical current of the dual anti-wound inductor to prevent core saturation of the dual anti-wound inductor and regulating an amount of output electrical current delivered by the power converter to the load in accordance with a reference input signal.

In accordance with these and other embodiments of the present disclosure, a system may be provided for controlling an electrical current through a dual anti-wound inductor integral to a power converter, the dual anti-wound inductor having a first winding and a second winding constructed such that its windings generate opposing magnetic fields in its magnetic core and constructed such that a coupling coefficient between the first winding and the second winding is less than approximately 0.95. The system may include an input for receiving a reference input signal and a current control subsystem configured to minimize a magnitude of a magnetizing electrical current of the dual anti-wound inductor to prevent core saturation of the dual anti-wound inductor and regulate an amount of output electrical current delivered by the power converter to the load in accordance with the reference input signal.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIGS. 19A-19C depict various waveforms for a three-cycle simulation of coordination of a midpoint sampler with a triangle modulator and the sampling process of FIG. 17C, in accordance with embodiments of the present disclosure;

FIGS. 23A-23C depict selected components of an observer for use in a control subsystem for a boost converter, in accordance with embodiments of the present disclosure;

FIG. 25A illustrates selected components of a control subsystem for a boost converter implementing two independent control loops for magnetizing and battery modes of the control subsystem, in accordance with embodiments of the present disclosure; and FIG. 25B depicts an example implementation of a state-space model for a control block of the control subsystem shown in FIG. 25A, in accordance with embodiments of the present disclosure.

DETAILED DESCRIPTION

Figure 6:
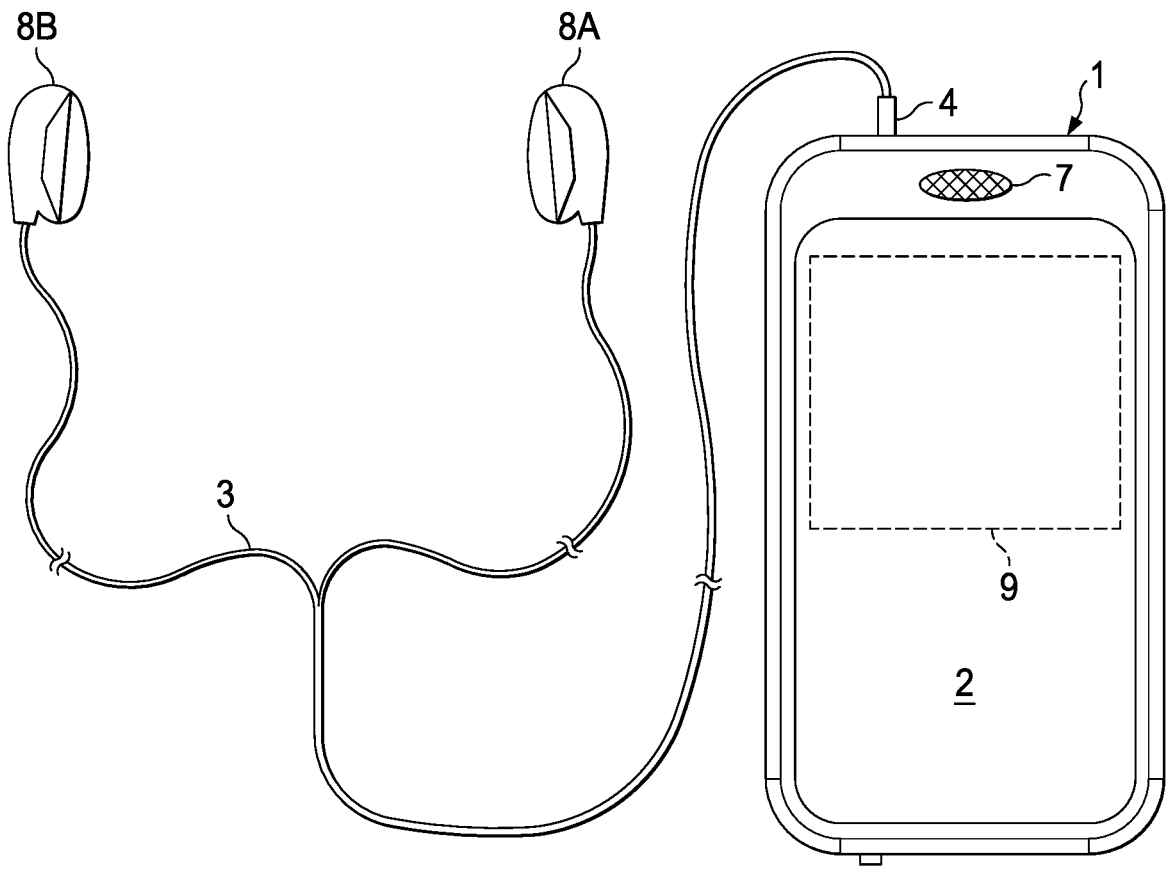
FIG. 6 illustrates selected components of an example personal mobile device, in accordance with embodiments of the present disclosure.

FIG. 6 illustrates an example personal mobile device 1, in accordance with embodiments of the present disclosure. FIG. 6 depicts personal mobile device 1 having a speaker 7. Speaker 7 is merely an example, and it is understood that personal mobile device 1 may be used in connection with a variety of transducers including magnetic coil loudspeakers, piezo speakers, haptic feedback transducers, and others. In addition or alternatively, personal mobile device 1 may be coupled to a headset 3 in the form of a pair of earbud speakers 8A and 8B. Headset 3 depicted in FIG. 6 is merely an example, and it is understood that personal mobile device 1 may be used in connection with a variety of audio transducers, including without limitation, headphones, earbuds, in-ear earphones, and external speakers. A plug 4 may provide for connection of headset 3 to an electrical terminal of personal mobile device 1. Personal mobile device 1 may provide a display to a user and receive user input using a touch screen 2, or alternatively, a standard liquid crystal display (LCD) may be combined with various buttons, sliders, and/or dials disposed on the face and/or sides of personal mobile device 1. As also shown in FIG. 6, personal mobile device 1 may include an integrated circuit (IC) 9 for generating an analog signal for transmission to speaker 7, headset 3, and/or another transducer.

Figure 7:
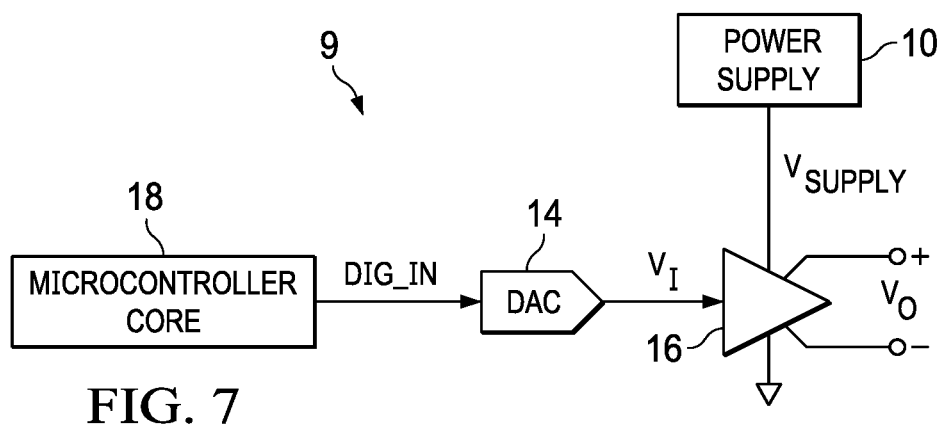
FIG. 7 illustrates a block diagram of selected components of an example integrated circuit of a personal mobile device for driving a transducer, in accordance with embodiments of the present disclosure.

FIG. 7 illustrates a block diagram of selected components of an example IC 9 of a personal mobile device for driving a transducer, in accordance with embodiments of the present disclosure. As shown in FIG. 7, a microcontroller core 18 may supply a digital input signal DIG_IN to a digital-to-analog converter (DAC) 14, which may convert the digital input signal to an analog input signal $V_{IN}$. DAC 14 may supply analog signal Vi to an amplifier 16 which may amplify or attenuate analog input signal Vi to provide a differential audio output signal $V_O$, which may operate a speaker, a headphone transducer, a piezoelectric transducer, a haptic feedback transducer, a line level signal output, and/or other suitable output. In some embodiments, DAC 14 may be an integral component of amplifier 16. A power supply 10 may provide the power supply rail inputs of amplifier 16.

In some embodiments, power supply 10 may comprise a switched-mode power converter, as described in greater detail below. Although FIGS. 6 and 7 contemplate that IC 9 resides in a personal mobile device, systems and methods described herein may also be applied to electrical and electronic systems and devices other than a personal mobile device, including transducer systems for use in a computing device larger than a personal mobile device, an automobile, a building, or other structure.

Figure 8:
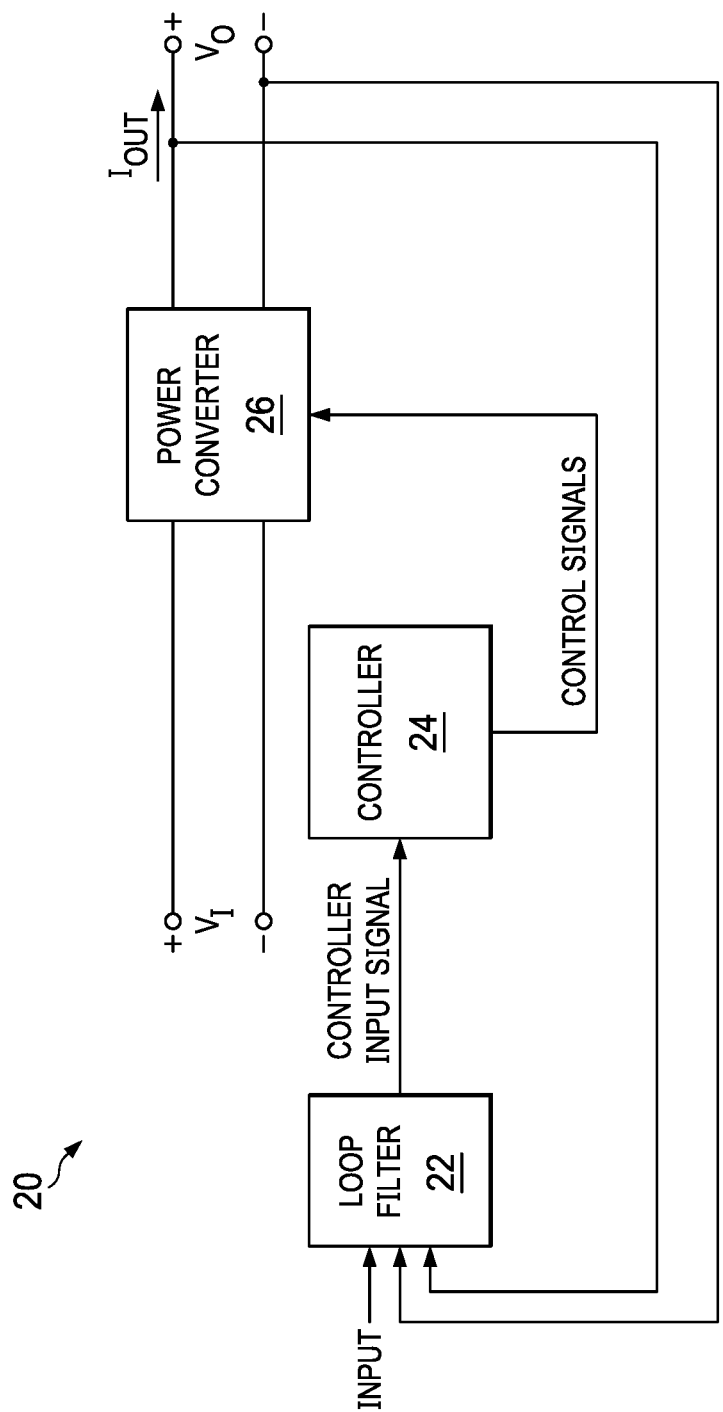
FIG. 8 illustrates a block and circuit diagram of selected components of an example switched mode amplifier, in accordance with embodiments of the present disclosure.

FIG. 8 illustrates a block and circuit diagram of selected components of an example switched mode amplifier 20, in accordance with embodiments of the present disclosure. In some embodiments, switched mode amplifier 20 may implement all or a portion of amplifier 16 described with respect to FIG. 7. As shown in FIG. 8, switched mode amplifier 20 may comprise a loop filter 22, a controller 24, and a power converter 26.

Loop filter 22 may comprise any system, device, or apparatus configured to receive an input signal (e.g., audio input signal $V_{IN}$ or a derivative thereof) and a feedback signal (e.g., audio output signal $V_O$, a derivative thereof, or other signal indicative of audio output signal $V_O$) and based on such input signal and feedback signal, generate a controller input signal to be communicated to controller 24. In some embodiments, such controller input signal may comprise a signal indicative of an integrated error between the input signal and the feedback signal. In other embodiments, such controller input signal may comprise a signal indicative of a target current signal to be driven as an output current $I_{OUT}$ or a target voltage signal to be driven as an output voltage $V_O$ to a load coupled to the output terminals of second control loop 28.

Controller 24 may comprise any system, device, or apparatus configured to, based on an input signal (e.g., input signal INPUT), output signal $V_O$, and/or other characteristics of switched mode amplifier 20, control switching of switches integral to power converter 26 in order to transfer electrical energy from a power supply $V_{SUPPLY}$ to the load of switched-mode amplifier 20 in accordance with the input signal.

Power converter 26 may comprise any system, device, or apparatus configured to receive at its input a voltage $V_{SUPPLY}$ (e.g., provided by power supply 10), and generate at its output an output voltage $V_O$. In some embodiments, voltage $V_{SUPPLY}$ may be received via input terminals of power converter 26 including a positive input terminal and a negative input terminal which may be coupled to a ground voltage. As described in greater detail in this disclosure (including, without limitation, in reference to FIGS. 9-14, below), power converter 26 may comprise a power inductor and a plurality of switches that are controlled by control signals received from controller 24 in order to convert voltage $V_{SUPPLY}$ to voltage $V_O$, such that audio output signal $V_O$ is a function of the input signal to loop filter 22.

Figure 9:
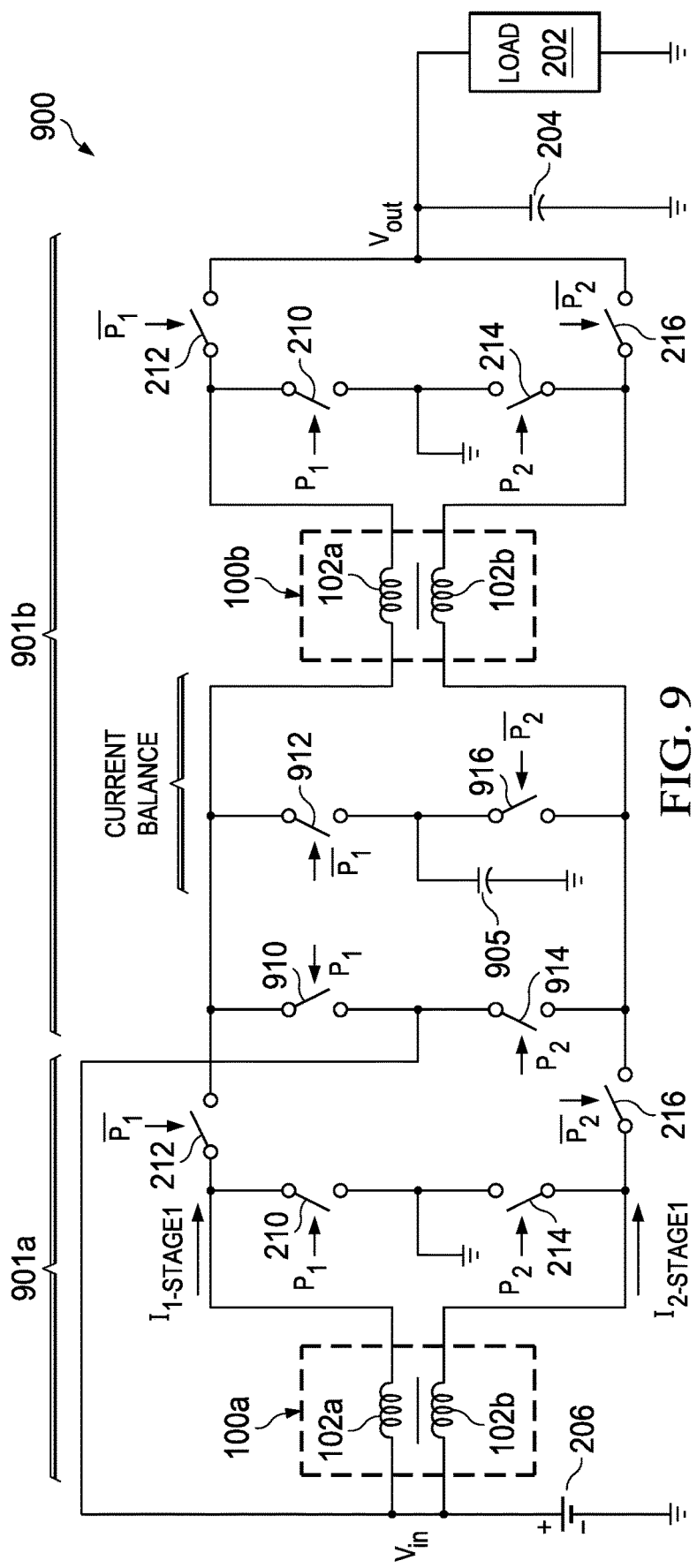
FIG. 9 illustrates selected components of an augmented two-stage boost converter with each stage using a multi-wound integrated inductor, in accordance with embodiments of the present disclosure.

FIG. 9 depicts selected components of an example augmented two-stage boost converter 900 that may be used with multi-wound inductors 100 and having a load 202, in accordance with embodiments of the present disclosure. In some embodiments, augmented two-stage boost converter 900 may be used to implement all or a portion of power supply 10 depicted in FIG. 7. In these and other embodiments, augmented two-stage boost converter 900 may be used to implement all or a portion of power converter 26 depicted in FIG. 8. Augmented two-stage boost converter 900 shown in FIG. 9 may be similar in many respects to two-stage boost converter 400 depicted in FIG. 4, and thus, only differences between augmented two-stage boost converter 900 and two-stage boost converter 400 may be discussed below. In particular, while first stage 901a of augmented two-stage boost converter 900 may be similar to first stage 401a of two-stage boost converter 400, augmented second stage 901b of augmented two-stage boost converter 900, as compared to second stage 401b of two-stage boost converter 400, may include additional switches 910, 912, 914, and 916 and capacitor 905 (in lieu of capacitor 405) arranged as shown in FIG. 9 and controlled by control signals $P_1$, $P_2$, $\overline{P_1}$, and $\overline{P_2}$ as shown in FIG. 9. As in two-stage boost converter 400, inductors 100a, 100b of each of stages 901a and 901b are dual, anti-wound inductors comprising a plurality of coils including coils 102a and 102b and wound in such a manner that a magnetic field in a core 104 produced by coils 102a and 102b cancels when currents through coils 102a and 102b are positive.

Figure 10A:
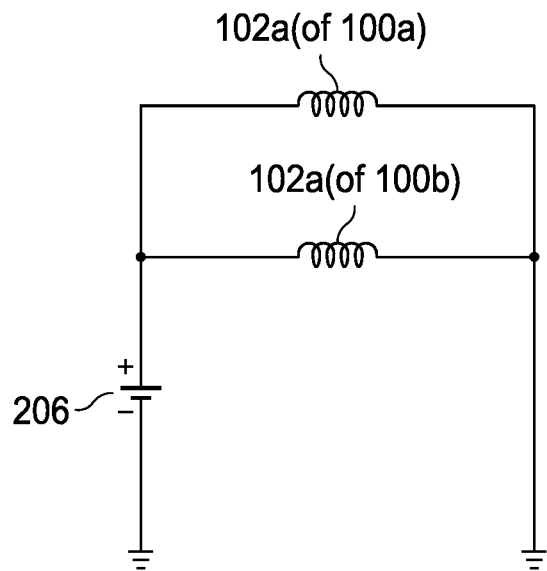
FIGS. 10A and 10B depict equivalent circuit diagrams showing connectivity of selected components of the augmented two-stage boost converter of FIG. 9 based on the values of switch control signals for the augmented two-stage boost converter, in accordance with embodiments of the present disclosure.
Figure 10B:
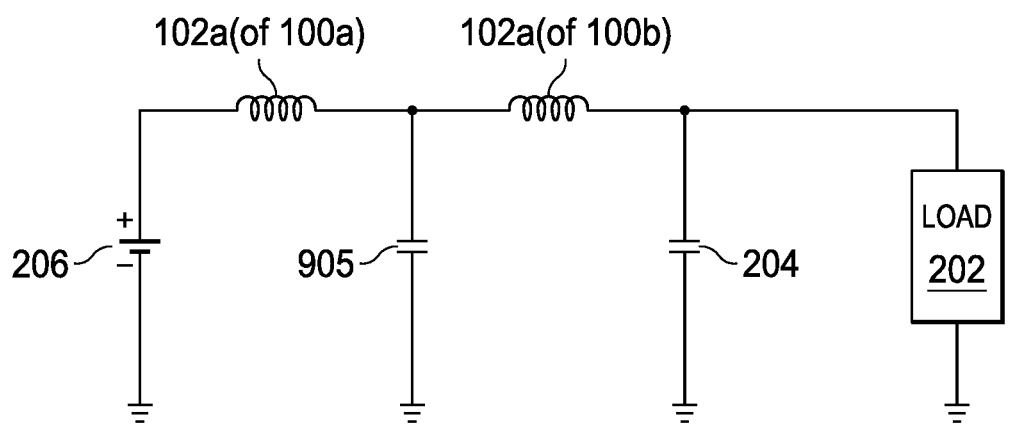

FIGS. 10A and 10B depict equivalent circuit diagrams showing connectivity of selected components of augmented two-stage boost converter 900 based on the values of switch control signals for augmented two-stage boost converter 900, in accordance with embodiments of the present disclosure. In particular, FIG. 10A depicts connectivity of top coils 102a of each of inductors 100a and 100b when control signal $P_1$ is asserted (and control signal $\overline{P_1}$ is deasserted) and FIG. 10B depicts connectivity of top coils 102a of each of inductors 100a and 100b when control signal $P_1$ is deasserted (and control signal $\overline{P_1}$ is asserted). For purposes of clarity of exposition, FIGS. 10A and 10B neglect all resistive switch losses.

As seen in FIG. 10A, when control signal $P_1$ is asserted (and control signal $\overline{P_1}$ is deasserted), top coils 102a of inductors 100a and 100b are in parallel to the power supply of battery 206 and ground. The configuration shown in FIG. 10A is a charging phase of augmented two-stage boost converter 900 in which energy is stored in top coils 102a. As seen in FIG. 10B, when control signal $P_1$ is deasserted (and control signal $\overline{P_1}$ is asserted), top coils 102a of inductors 100a and 100b are in series to the power supply of battery 206 and ground. The configuration shown in FIG. 10B is a transfer phase of augmented two-stage boost converter 900 in which energy is transferred from top coils 102a to capacitor 204 and load 202.

Thus, the unique behavior of charging coils 102a from the two stages in parallel and transferring stored energy from coils 102a in series may be an advantage of this architecture. The bottom coils 102b of inductors 100a and 100b may be controlled in a similar manner.

Because first stage 901a and augmented second stage 901b charge in parallel and transfer in series, the total boost voltage ratio is the sum of the contribution of each stage, as given by:

$$\frac{V_{out}}{V_{in}} = \frac{2}{1-D} \tag{4}$$

assuming no resistive losses. Equation 4 shows that the boost action of each stage 901a, 901b combines additively, in contrast to two-stage boost converter 400 in which the boost action of each stage 401a, 401b combines multiplicatively. As a result, augmented two-stage boost converter 900 may require a smaller duty cycle than single-stage boost converter 200 in order to achieve the same boost ratio (though to a lesser extent than two-stage converter 400) which may minimize current ripple.

When control signal $\overline{P_1}$ of augmented two-stage boost converter 900 transitions from asserted to deasserted (and control signal $\overline{P_2}$ transitions from deasserted to asserted), it is possible that currents $I_{1\text{-}STAGE1}$ and $I_{1\text{-}STAGE2}$ in coils 102a may not be exactly equal. This unequal current may occur because when control signal $P_1$ is asserted, the conduction path resistance for coils 102a of inductors 100a and 100b may be different (e.g., inductor 100b may have an extra switch in its conduction path when control signal $P_1$ is asserted that can add switch resistance). When two inductors with different currents are connected in series, the current in one (or both) of the inductors must change rapidly to satisfy continuity. However, rapid changes of current in inductors may generate large, potentially damaging voltages in the circuit. To solve this problem, switch 912 may couple capacitor 905 between the common electrical node of coils 102a (when control signal $P_1$ is deasserted) and ground, providing an alternative path to any such excess current. For bottom coils 102b of inductors 100a and 100b, switch 916 may be used for a similar purpose for which switch 912 is used.

In contrast with capacitor 405 of two-stage boost converter 400, capacitor 905 may be much smaller with minimal impact to total circuit area. In fact, in some instances such capacitor could have a sufficiently small capacitance that capacitor 905 may be formed within the integrated circuit of augmented two-stage power converter 900. A natural consequence of the architecture of augmented two-stage power converter 900 is that capacitor 905 may balance current between first stage 901a and augmented second stage 901b.

Figure 11A:
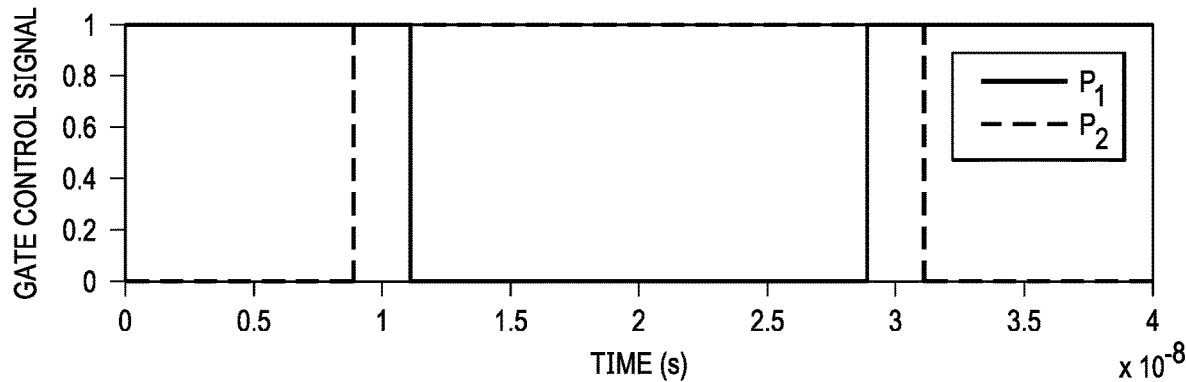
FIGS. 11A-11C depict a circuit simulation of currents for the multi-wound integrated inductors of the augmented two-stage boost converter shown in FIG. 9 over one pulse-width modulation cycle, in accordance with embodiments of the present disclosure.
Figure 11B:
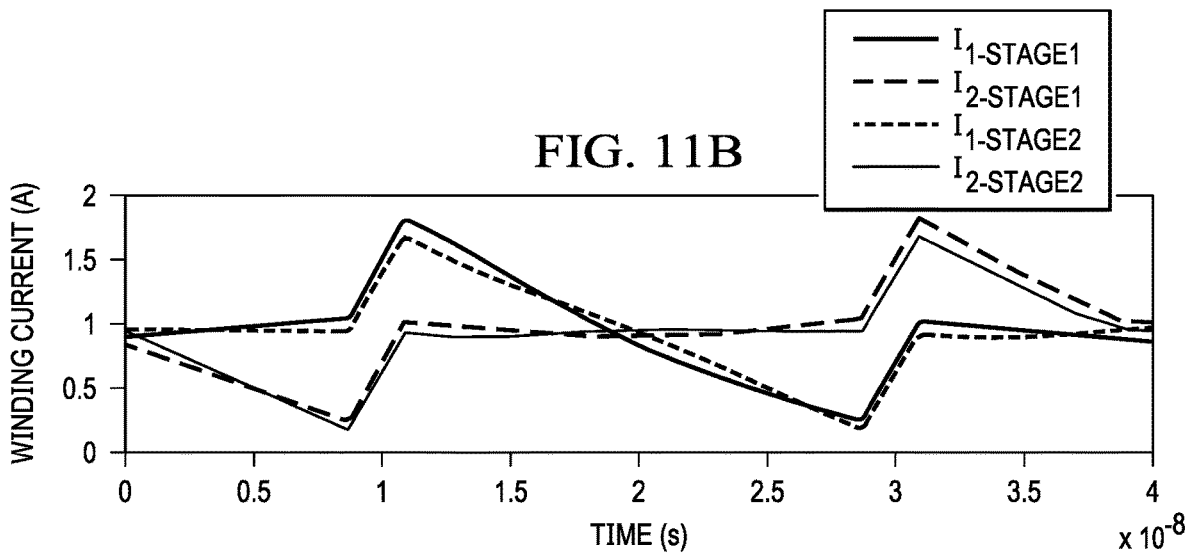
Figure 11C:
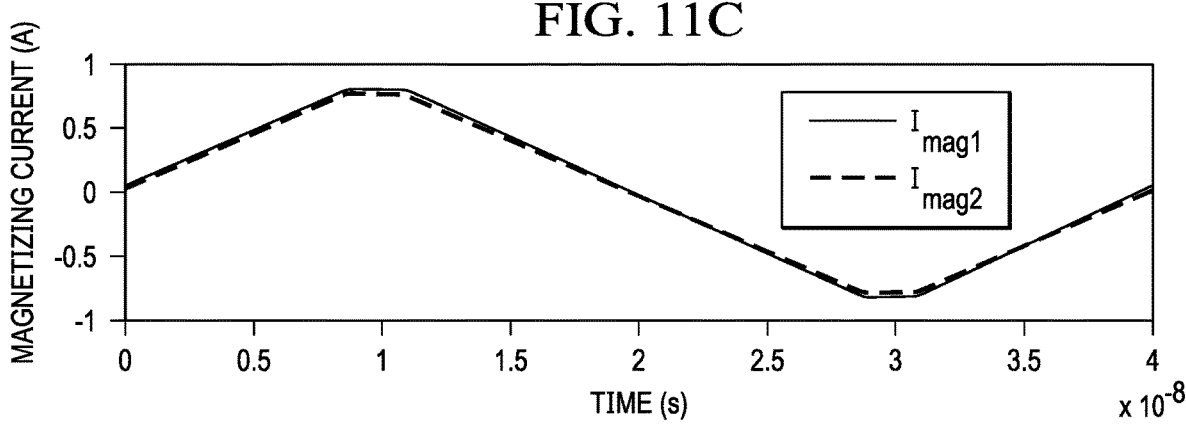

FIGS. 11A-11C depict a circuit simulation of currents for the multi-wound integrated inductors of the augmented two-stage boost converter 900 shown in FIG. 9 over one pulse-width modulation cycle, in accordance with embodiments of the present disclosure. FIG. 11A depicts example control signals $P_1$ and $P_2$ and FIG. 11B depicts currents of coils 102a and 102b of inductors 100a and 100b. During the states when either control signal $P_1$ is asserted and control signal $P_2$ is deasserted or control signal $P_1$ is deasserted and control signal $P_2$ is asserted, at least of a pair of coils 102 is coupled in series to load 202 as shown in FIG. 10B. In these states, energy may be transferred from the magnetic fields of inductors 100A and 100B at the same time energy may be simultaneously stored in the magnetic field. In effect, in such states, energy may be transferred from one coil 102 of an inductor 100 to the other coil 102 of the inductor. Such transformer action may keep excessive energy from building up in magnetic core 104, thereby potentially preventing early saturation.

Augmented two-stage power converter 900 may prevent current saturation because it may minimize the total magnetic field in magnetic core 104, thereby minimizing the amount of magnetic energy stored in magnetic core 104. The total magnetic field in magnetic core 104 may be proportional to magnetization current, $I_{mag}$, which (for each inductor 100) may be defined as:

$$I_{mag} = I_1 - I_2 \quad (5)$$

When magnetization current $I_{mag}$ is greater than or equal to magnetization current saturation limit $I_{diff}^{sat}$, magnetic core 104 may saturate.

FIG. 11C depicts magnetizing currents $I_{mag1}$ and $I_{mag2}$ for inductors 100a and 100b, respectively. When control signals $P_1$ and $P_2$ are both asserted, currents in coils 102 are both increasing because both are coupled in parallel between power supply and ground, as previously shown in FIG. 10A. However, during this state, the magnetizing currents $I_{mag1}$ and $I_{mag2}$ stay relatively flat because the flux generated by each coil 102 is changing at equal rates, and thus the difference remains constant. This flatness of currents may, in effect, create a "flat-top" to the magnetizing current waveforms as shown in FIG. 11C that prevents the magnetizing currents $I_{mag1}$ and $I_{mag2}$ from saturating.

Figure 2:
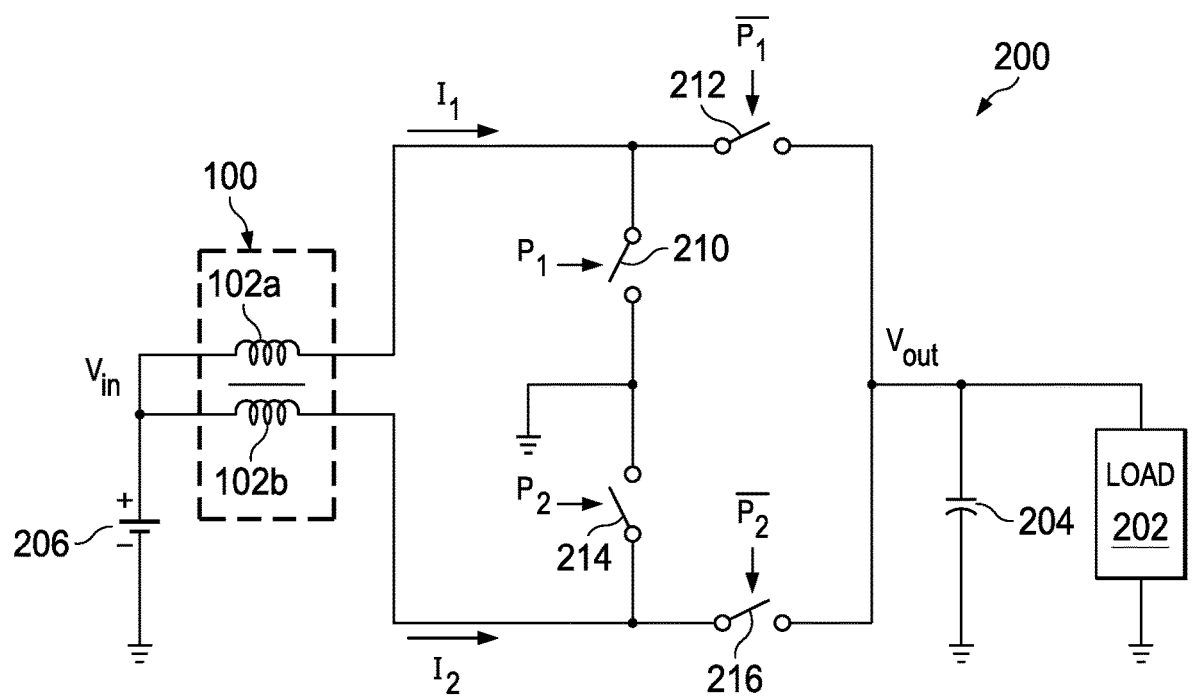
FIG. 2 illustrates a single-stage boost converter using a multi-wound integrated inductor, in accordance with embodiments of the present disclosure.
Figure 4:
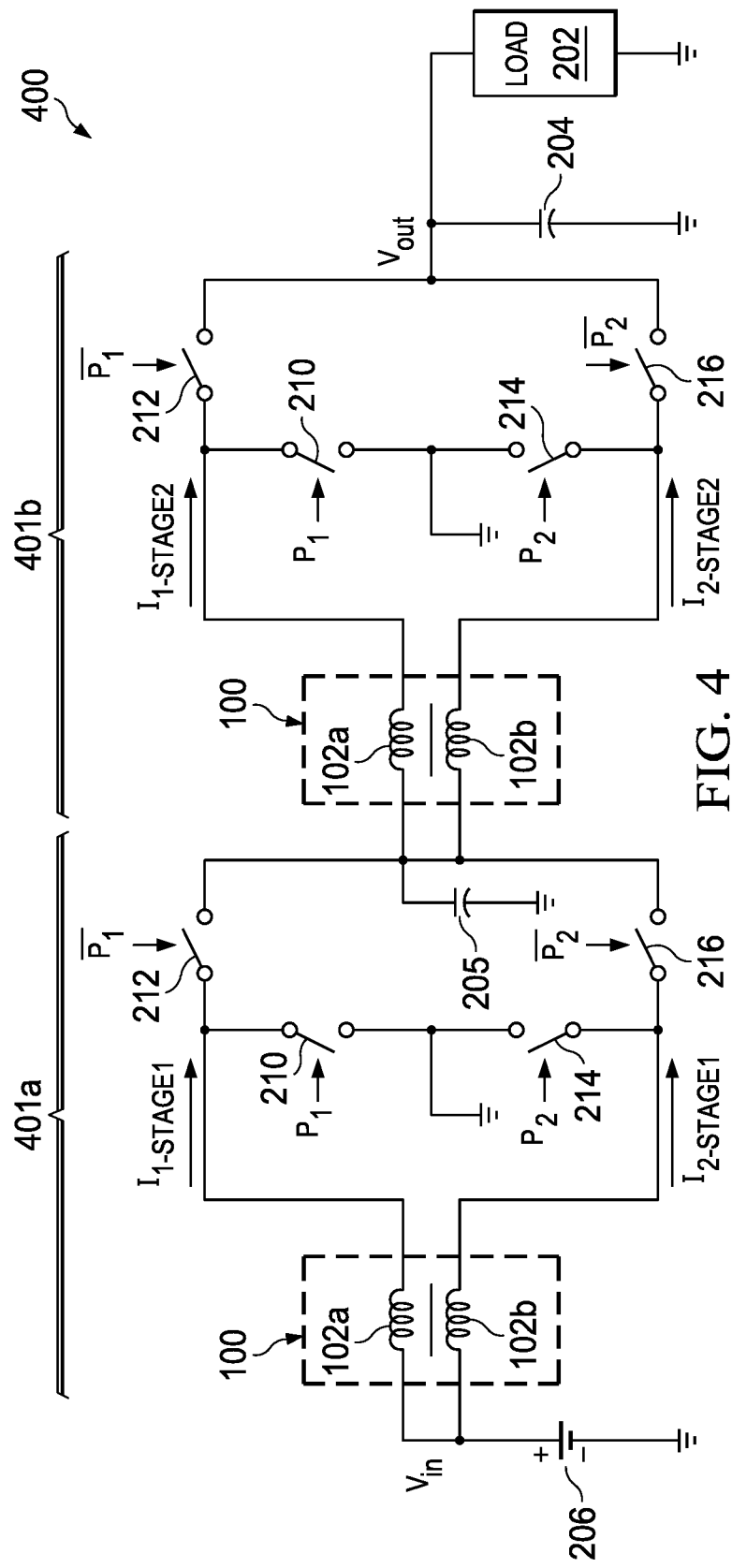
FIG. 4 illustrates a two-stage boost converter with each stage using a multi-wound integrated inductor, in accordance with embodiments of the present disclosure.
Figure 5A:
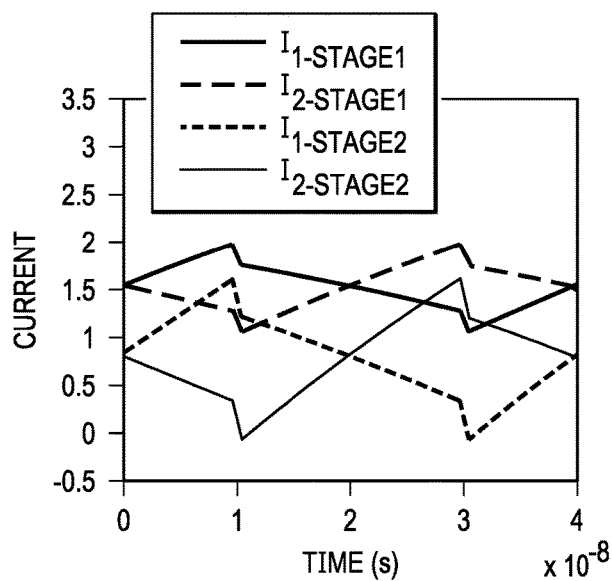
FIG. 5A depicts a circuit simulation of currents for the multi-wound integrated inductors of the two-stage boost converter shown in FIG. 4 over one pulse-width modulation cycle, in accordance with embodiments of the present disclosure.
Figure 5B:
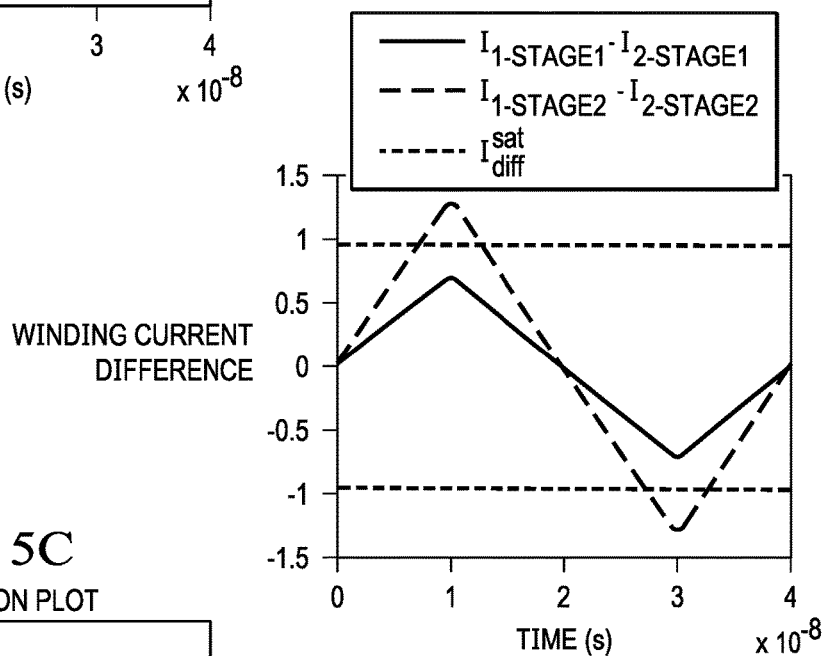
FIG. 5B depicts a circuit simulation of a current difference and a current saturation level for the multi-wound integrated inductors of the two-stage boost converter shown in FIG. 4, in accordance with embodiments of the present disclosure.
Figure 5C:
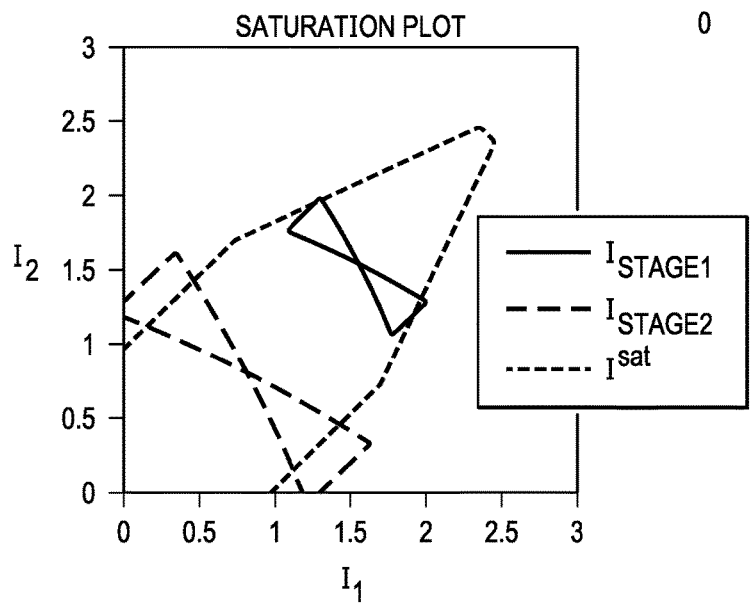
FIG. 5C illustrates a saturation profile of currents within the multi-wound integrated inductors of the two-stage boost converter shown in FIG. 4, in accordance with embodiments of the present disclosure.

The advantage of the two-stage, augmented boost architecture depicted in FIG. 9 is that it may reduce peak currents compared to the single-stage architecture depicted in FIG. 2 and the two-stage architecture depicted in FIG. 4 and may minimize energy stored in the core of inductors 100, thus minimizing a likelihood of core saturation. Because of these advantages, the current control methodology described below contemplates use of the two-stage, augmented boost architecture depicted in FIG. 9. However, the concepts, methods, and systems discussed below could be extended to the single-stage architecture depicted in FIG. 2, the two-stage architecture depicted in FIG. 4, or any other boost architectures, including without limitation those disclosed in U.S. patent application Ser. No. 16/692,072 filed Nov. 22, 2019, which is incorporated by reference herein in its entirety.

As discussed above, the output of augmented two-stage boost converter 900 may be controlled by the duty cycles of control signals $P_1$ and $P_2$. These duty cycles may be time-varying signals that must be carefully chosen to prevent core saturation due to disturbances and regulate the amount of output current.

FIGS. 11A-11C discussed above depict idealized pulse-width modulation and current waveforms during steady-state operation. However, in reality, augmented two-stage boost converter 900 may experience some deviations from these idealized waveforms. If the pulse-width modulated control signals $P_1$ and $P_2$ are generated by a digital process, then clock jitter, quantization effects, and mismatch in the digital components may cause the actual pulse-width modulated control signals $P_1$ and $P_2$ to vary from what is commanded. In addition, non-idealities in analog circuitry of augmented two-stage boost converter 900, such as switching time of transistor switches, gate drive effects (e.g., switch non-overlap time), and thermal effects, may cause additional deviations in the response of augmented two-stage boost converter 900.

Figure 12A:
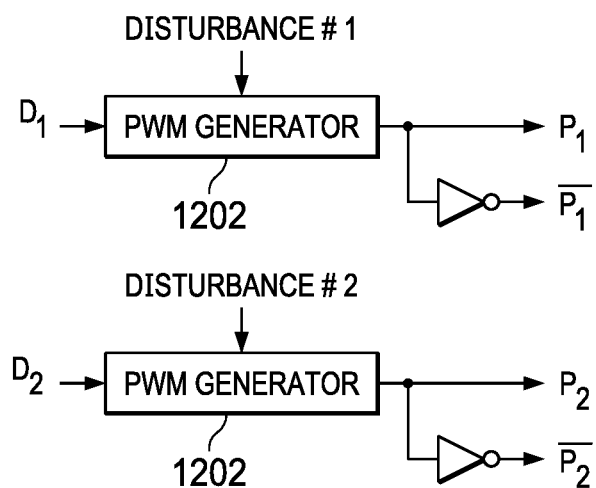
FIG. 12A depicts an example model for modeling effects of disturbance in generation of pulse-width modulation control signals, in accordance with embodiments of the present disclosure.
Figure 12B:
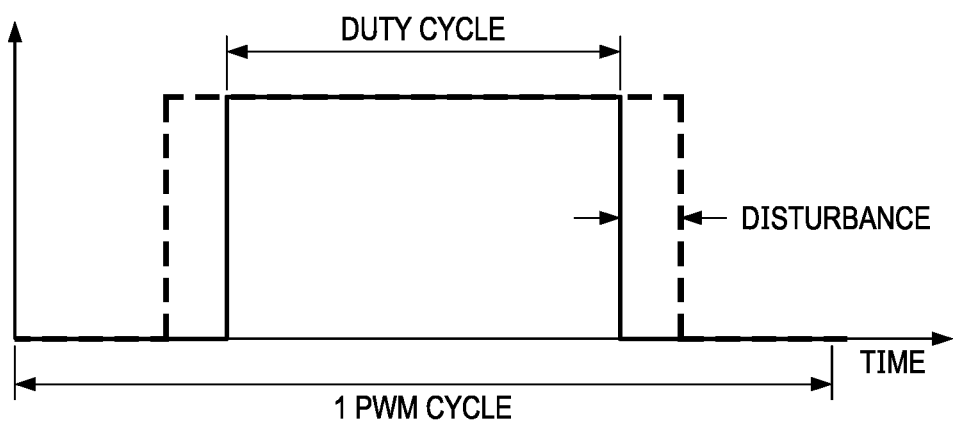
FIG. 12B depicts an ideal pulse-width modulated control signal and the ideal pulse-width modulated control signal affected by a disturbance, in accordance with embodiments of the present disclosure.

For example, FIG. 12A depicts an example model for modeling effects of disturbance in generation of pulse-width modulated control signals $P_1$ and $P_2$, and FIG. 12B depicts an ideal pulse-width modulated control signal (e.g., control signal $P_1$) and the ideal pulse-width modulated control signal affected by a disturbance, in accordance with embodiments of the present disclosure. As shown in FIG. 12A, two separate pulse-width modulation (PWM) generators 1202 may use two independent duty cycles $D_1$ and $D_2$ to generate control signals $P_1$, $P_2$, $\overline{P_1}$, and $\overline{P_2}$ for augmented two-stage boost converter 900. Each PWM generator 1202 may have an independent disturbance source that causes a perturbation in its generated PWM waveform, as shown in FIG. 12B. This disturbance may move one or more edges of the PWM waveform, effectively changing its duty cycle.

Figure 13A:
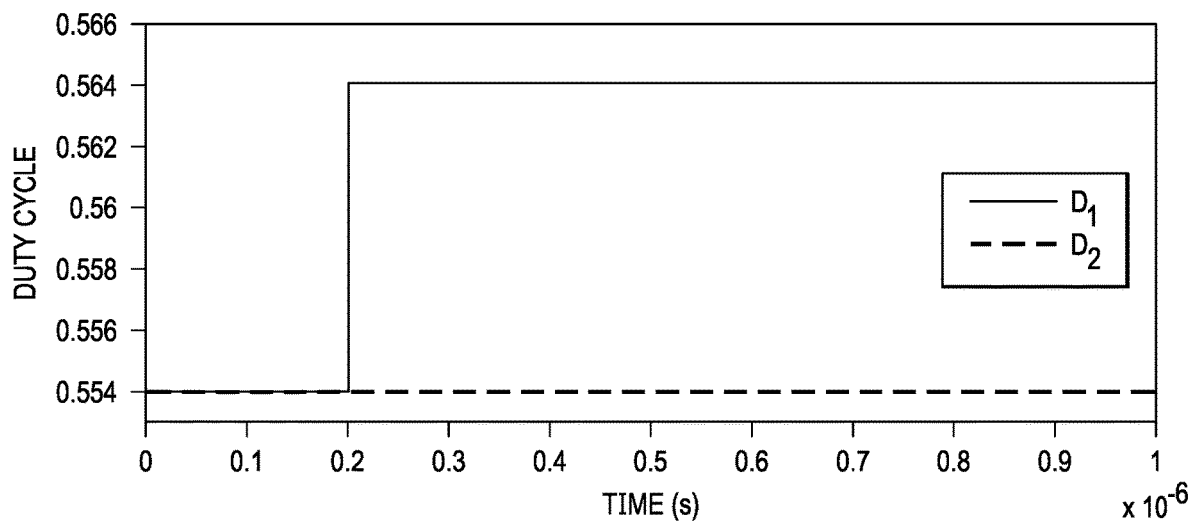
FIGS. 13A and 13B depict a simulation of an example step disturbance in the generation of pulse-width modulated control signals using the disturbance model of FIG. 12A, in accordance with embodiments of the present disclosure.
Figure 13B:
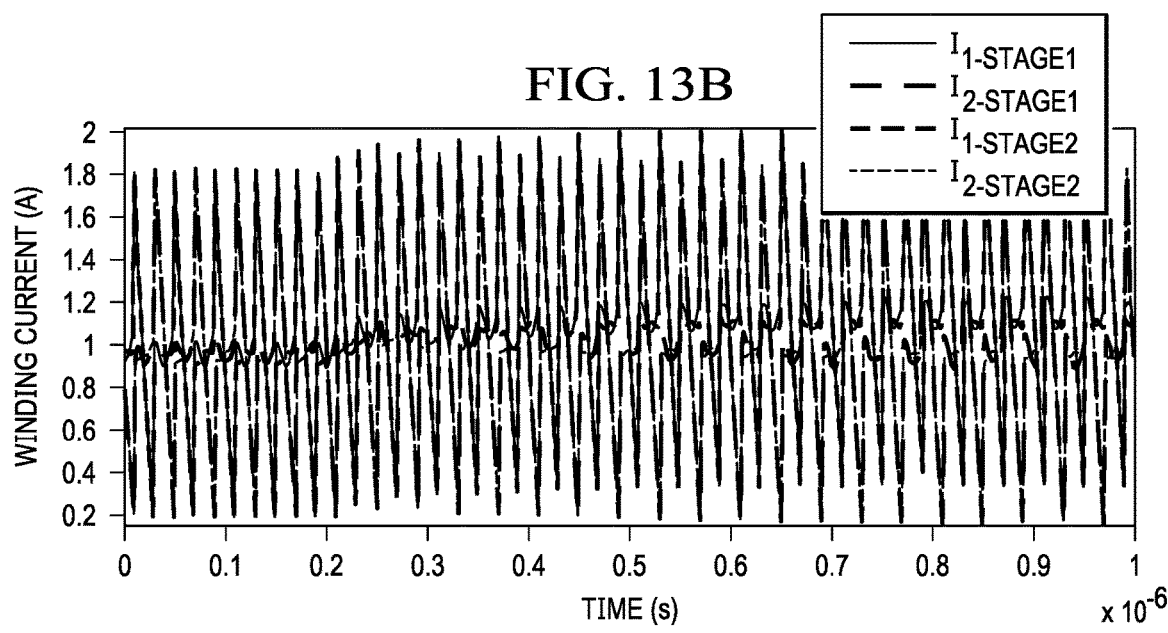

Such disturbances may be problematic as they may lead to inductor saturation. FIGS. 13A and 13B depict a simulation of an example step disturbance using the disturbance model of FIG. 12A. In the example of FIGS. 13A and 13B, a 1% step disturbance is introduced in duty cycle $D_1$ at a time t=0.2 µs, while duty cycle $D_2$ remains undisturbed as shown in FIG. 13A. FIG. 13B shows a simulation of currents through coils 102a and 102b of inductors 100 responsive to the step disturbance.

Figure 14B:
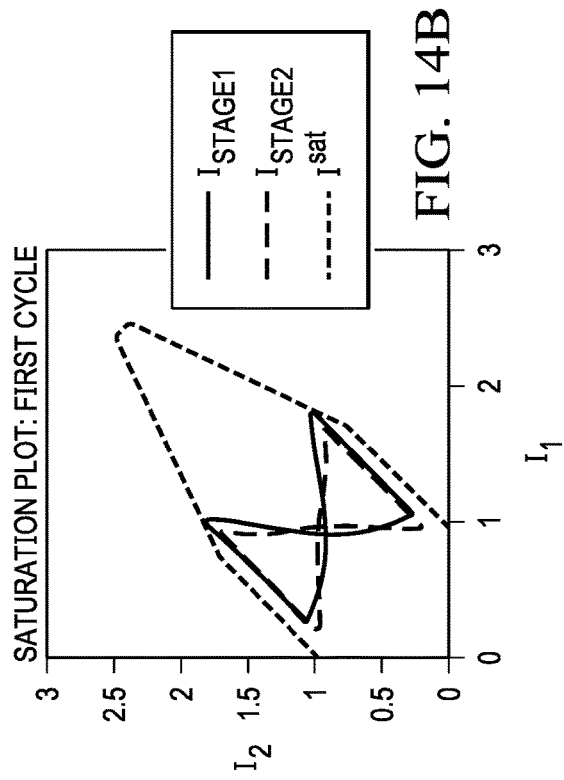
FIG. 14B illustrates a saturation profile of currents within the multi-wound integrated inductors of the augmented two-stage boost converter shown in FIG. 9 during a cycle of operation prior to a disturbance in generation of a pulse-width modulated control signal, in accordance with embodiments of the present disclosure.
Figure 14C:
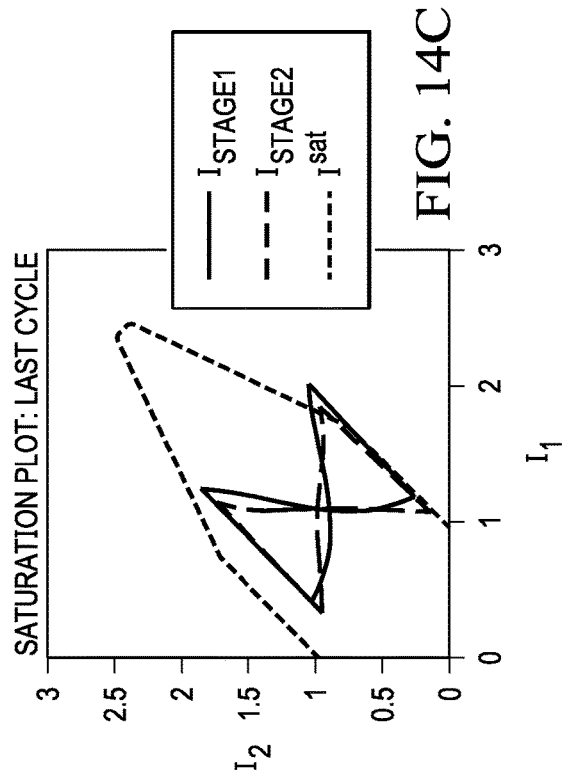
FIG. 14C illustrates a saturation profile of currents within the multi-wound integrated inductors of the augmented two-stage boost converter shown in FIG. 9 during a cycle of operation after a disturbance in generation of a pulse-width modulated control signal, in accordance with embodiments of the present disclosure.
Figure 14A:
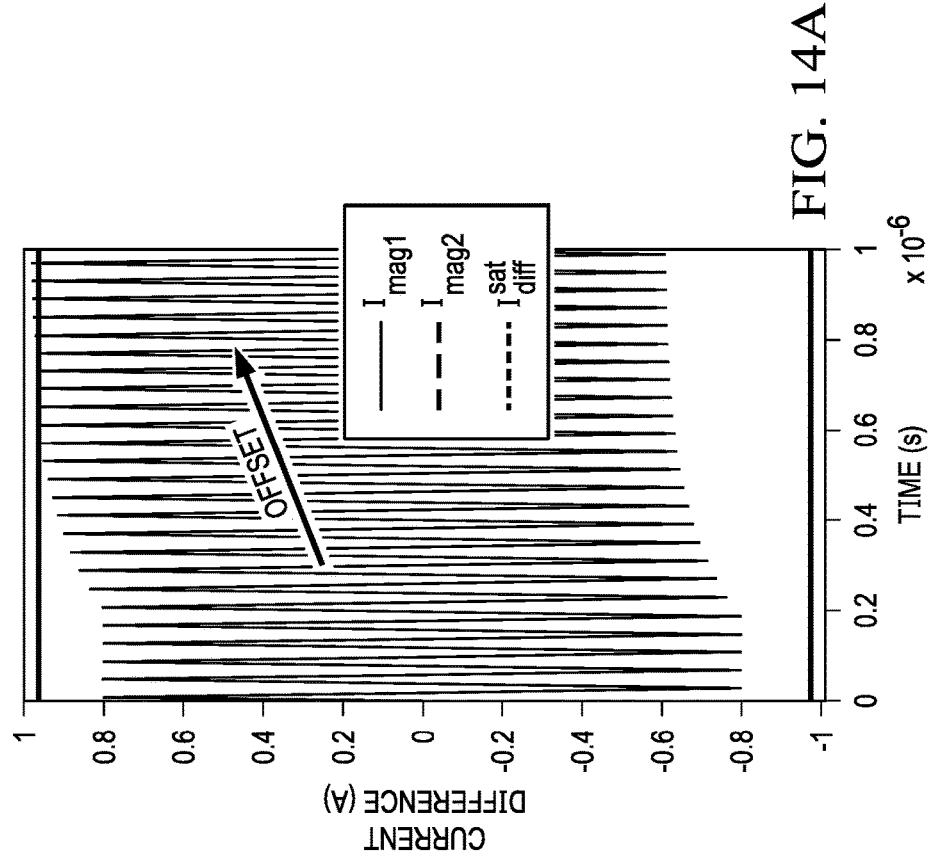
FIG. 14A depicts magnetizing currents of inductors resulting from the response of the augmented two-stage boost converter shown in FIG. 9 to the step disturbance depicted in FIGS. 13A and 13B along with a magnetizing current saturation limit, in accordance with embodiments of the present disclosure.

FIG. 14A depicts magnetizing currents $I_{mag1}$ and $I_{mag2}$ for inductors 100a and 100b, respectively, resulting from the response of augmented two-stage boost converter 900 to the step disturbance depicted in FIGS. 13A and 13B, along with saturation level $I_{diff}^{sat}$, in accordance with embodiments of the present disclosure. FIG. 14B illustrates a saturation profile of currents within the multi-wound integrated inductors of augmented two-stage boost converter 900 during a cycle of operation prior to a disturbance in generation of a pulse-width modulated control signal, in accordance with embodiments of the present disclosure. Similarly, FIG. 14C illustrates a saturation profile of currents within the multi-wound integrated inductors of augmented two-stage boost converter 900 during a cycle of operation after a disturbance in generation of a pulse-width modulated control signal, in accordance with embodiments of the present disclosure.

Before the disturbance of FIG. 13A is applied, as shown in FIG. 14B, currents of inductors 100 may remain within the saturation boundary $I^{sat}$ However, as shown in FIG. 14C, after a number of cycles after the disturbance, one or more currents of inductors 100 may exceed the saturation boundary $I^{sat}$.

Accordingly, as shown above, a 1% disturbance in control signals $P_1$, $P_2$, $\overline{P_1}$, and $\overline{P_2}$ may be sufficient to cause a failure of augmented two-stage boost converter 900 due to inductor core saturation. Larger disturbances in either or both of control signals $P_1$, $P_2$ may cause augmented two-stage boost converter 900 to exceed its limits by an even greater extent. Thus, augmented two-stage boost converter 900 may be very sensitive to disturbance generation of control signals $P_1$, $P_2$, $\overline{P_1}$, and $\overline{P_2}$. Such sensitivity may be largely due to the small inductance values of integrated inductors 100. To ensure proper operation, control signals $P_1$, $P_2$, $\overline{P_1}$, and $\overline{P_2}$ may be controlled to regulate currents and prevent inductor saturation from disturbances.

In addition to the disturbance rejection problem discussed above, control signals $P_1$, $P_2$, $\overline{P_1}$, and $\overline{P_2}$ may be controlled to deliver power to load 202 of augmented two-stage boost converter 900 and maintain a regulated output boost voltage $V_{out}$. In a boost converter for audio applications, output boost voltage $V_{out}$ may vary by three times or more to meet the requirements of a class H or class G/H amplifier. Loading on the output of augmented two-stage boost converter 900 may vary over a wide range as well. Audio content may have a high crest factor and may vary rapidly from silence (0 Watts) to full scale (~10 Watts) in tens of microseconds. Additionally, where load 202 is a speaker, impedance of load 202 may vary by two times or more across operating frequencies and temperatures. Thus, it may be desirable that augmented two-stage boost converter 900 be capable of responding to rapidly changing output voltage commands and loading conditions.

Figure 15:
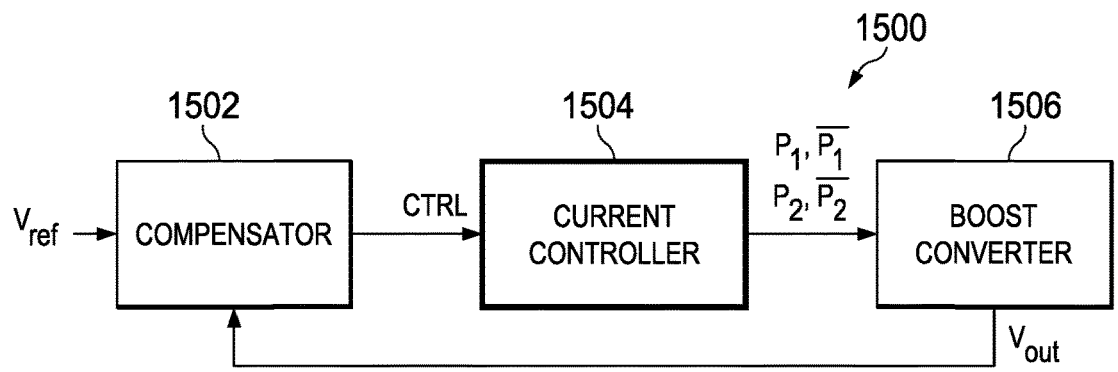
FIG. 15 illustrates an example voltage control loop that may be used in connection with a boost converter, in accordance with embodiments of the present disclosure.

A voltage control loop may be commonly used to meet the requirements of time varying output voltages and loads. FIG. 15 illustrates selected components of an example voltage control loop 1500 that may be used in connection with a boost converter 1506 (e.g., which may be implemented with augmented two-stage boost converter 900 or any other suitable boost converter), in accordance with embodiments of the present disclosure.

As shown in FIG. 15, a compensator 1502 may receive a reference voltage $V_{ref}$ which may represent the desired regulated output boost voltage $V_{out}$, and which may be time-varying. Compensator 1502 may compare reference voltage $V_{ref}$ and sensed output boost voltage $V_{out}$ and generate a control signal CTRL based on the comparison and a control algorithm. In many architectures, control signal CTRL may drive an inner current control loop implemented by a current controller 1504. Such current control loop may regulate an amount of average current delivered to capacitor 204 and load 202, thereby regulating output boost voltage $V_{out}$. However, for proper operation, current controller 1504 may need to simultaneously prevent inductor saturation.

Thus, it may be desirable that a boost converter (e.g., augmented two-stage boost converter 900 or other boost converter 1506) using a multi-wound inductor 100 have a current controller 1504 that meets two requirements: (a) current controller 1504 regulates currents in inductors 100 to prevent saturation from disturbances; and (b) current controller 1504 regulates an output current driven to the load of boost converter 1506 to meet the requirements of audio systems with time varying boost voltages and loading.

Figure 16A:
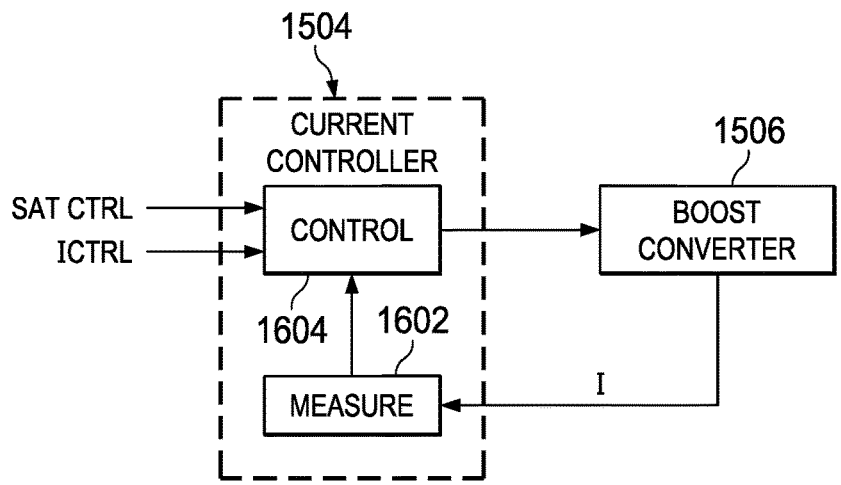
FIG. 16A illustrates selected components of an example current control scheme that may be used in connection with a boost converter, in accordance with embodiments of the present disclosure.

FIG. 16A illustrates selected components of an example current control scheme that may be used in connection with boost converter 1506, in accordance with embodiments of the present disclosure. As shown in FIG. 16A, current controller 1504 may include a measurement block 1602 configured to receive a sensed inductor current I (e.g., a current $I_1$ or $I_2$ of an inductor 100) and perform a calculation on sensed inductor current I to generate a signal that is indicative of inductor coil currents $I_1$ or I2. Current controller 1504 may have two external signals: (a) saturation control signal SATCTRL which may regulate current saturation; and (b) a current control signal ICTRL which controls a target output current delivered to load 202. A control block 1604 may receive an output of measurement block 1602, saturation control signal SATCTRL, and current control signal ICTRL to generate control signals for switches of boost converter 1506.

Figure 16B:
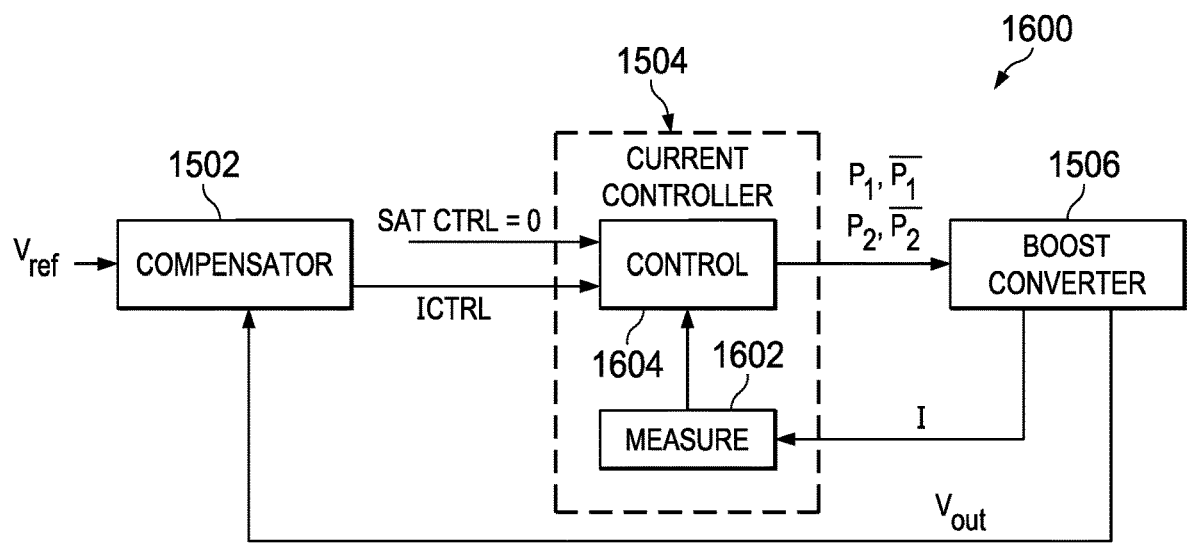
FIG. 16B illustrates selected components of an example control subsystem that may be used in connection with a boost converter and the current control scheme depicted in FIG. 16A, in accordance with embodiments of the present disclosure.

FIG. 16B illustrates selected components of an example control subsystem 1600 that may be used in connection with boost converter 1506 and the current control scheme depicted in FIG. 16A, in accordance with embodiments of the present disclosure. As shown in FIG. 16B, compensator 1502 may be used to generate current control signal ICTRL based on a comparison of reference voltage $V_{ref}$ and sensed output boost voltage $V_{out}$, which may allow compensator 1502 to regulate an amount of current delivered from boost converter 1506 and thus regulate output boost voltage $V_{out}$. As shown in FIG. 16B, saturation control signal SATCTRL may be permanently set to zero to minimize energy stored in the cores of inductors 100 and prevent saturation due to disturbances. Control block 1604 may receive an output of measurement block 1602 (indicative of measured current inductor coil currents $I_1$ or $I_2$), saturation control signal SATCTRL, and current control signal ICTRL to generate control signals $P_1$, $P_2$, $\overline{P_1}$, and $\overline{P_2}$ for switches of boost converter 1506.

The discussion below outlines several example embodiments, grouped into four sections related to either control or measurement of circuit parameters, for implementing control subsystem 1600.

1. Generating PWM Control Signals and Calculating Cycle Averages

Figure 17A:
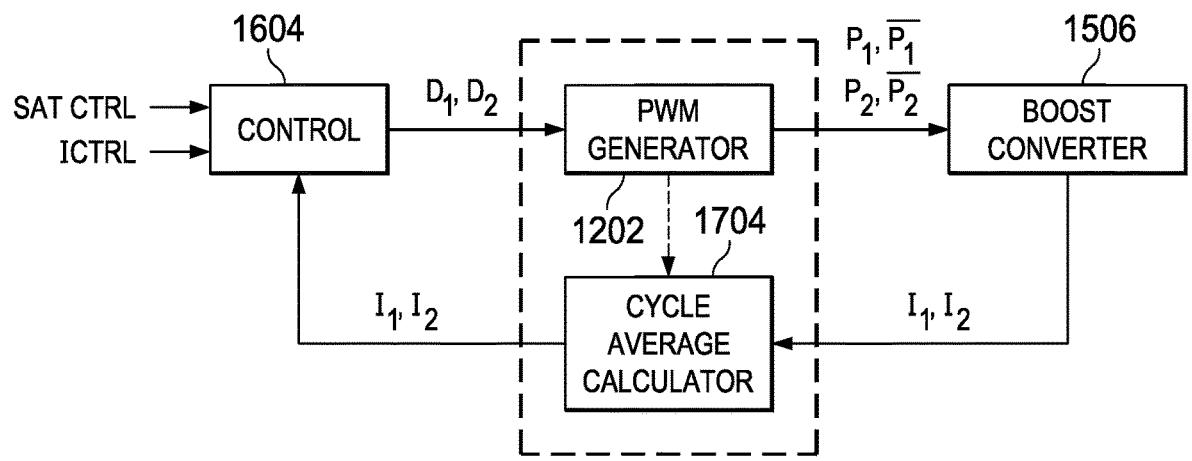
FIG. 17A illustrates selected components, including a cycle average calculator, for performing calculation of cycle averages of inductor coil currents, in accordance with embodiments of the present disclosure.

The measurement process of measurement block 1602 may comprise calculating the cycle averages of inductor coil currents $I_1$ and $I_2$ of coils 102a and 102b of inductors 100 in a manner that is coordinated or linked to the PWM generation process. FIG. 17A illustrates selected components, including a cycle average calculator 1704, for performing calculation of cycle averages of inductor coil currents $I_1$ and $I_2$, in accordance with embodiments of the present disclosure.

Figure 18A:
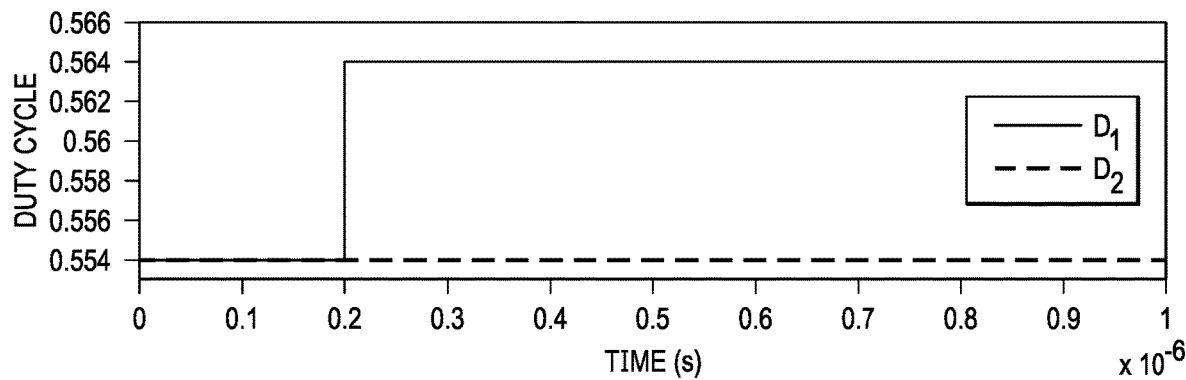
FIGS. 18A and 18B depict a simulation of an example step disturbance in the generation of pulse-width modulated control signals, in accordance with embodiments of the present disclosure.
Figure 18B:
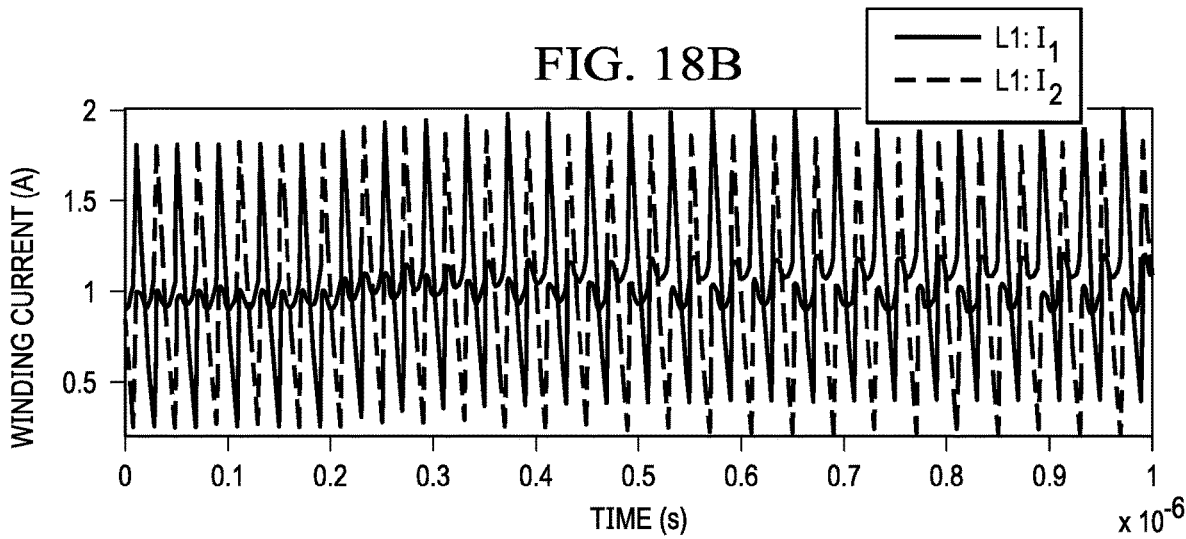
Figure 18C:
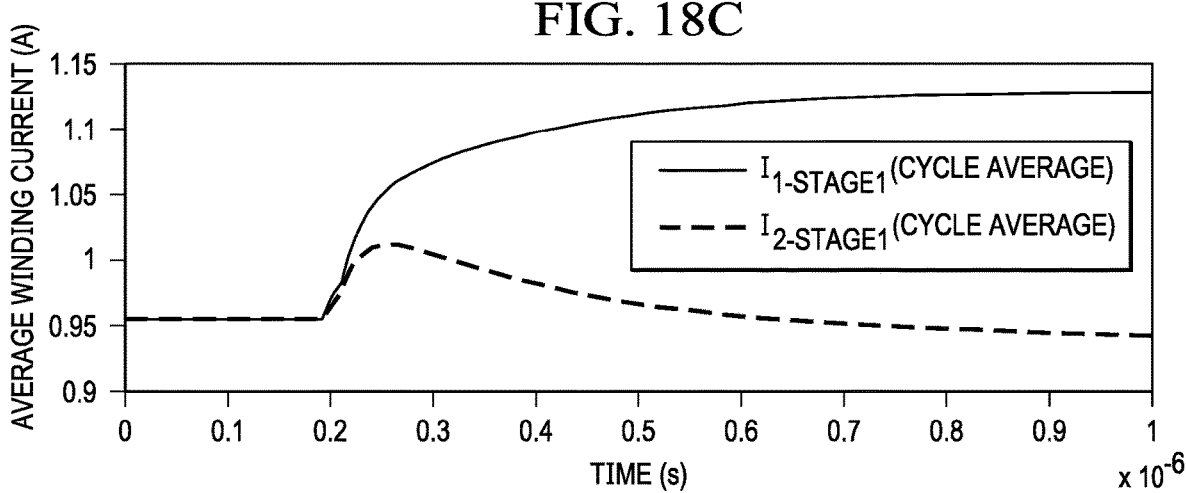
FIG. 18C depicts example waveforms for cycle average currents of inductor currents in response to the step disturbance of FIG. 18A, in accordance with embodiments of the present disclosure.

To further illustrate, such functionality, FIGS. 18A and 18B depict a simulation of an example 1% step disturbance introduced in duty cycle $D_1$ at a time t=0.2 µs, while duty cycle $D_2$ remains undisturbed as shown in FIG. 18A. FIG. 18B shows a simulation of currents through coils 102a and 102b of a dual-wound inductor 100 responsive to the step disturbance. FIG. 18C depicts a plot of the average winding currents $I_1$ and $I_2$ of coils 102a and 102b. Calculating an average of currents $I_1$ and $I_2$ may remove the effect of the current ripple within a PWM cycle and may be a much clearer indicator of the current dynamic behavior. The use of average currents may therefore simplify current control by current controller 1504.

Notably, FIGS. 18B and 18C depict only currents $I_1$ and $I_2$ of coils 102a and 102b of first-stage inductor 100a of augmented two-stage power converter 900 and omit currents for second-stage inductor 100b. However, because of the augmented two-stage architecture, currents $I_1$ and $I_2$ for inductor 100a may be similar to that of 100b, and current controller 1504 may take advantage of this similarity by only measuring currents of one of inductors 100 and controlling all currents based on such measurement.

Figure 17B:
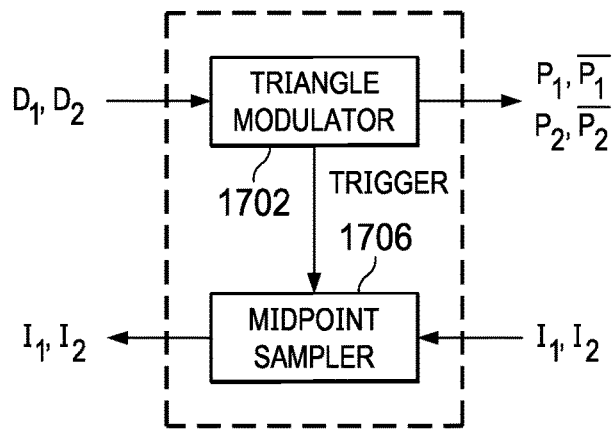
FIG. 17B illustrates selected components of a system for using a triangle carrier signal of a triangle modulator to generate pulse-width modulated control signals and using such triangle carrier signal to trigger a midpoint sampler configured to sample current values of the midpoint of the "ON" time of a pulse-width modulated control signals, in accordance with embodiments of the present disclosure.

Cycle average calculator 1704 may calculate average cycle values for currents $I_1$ and $I_2$ in any suitable manner, including directly by sampling multiple points and summing, implementing a circuit that automatically integrates currents $I_1$ and $I_2$ over a cycle, or using a triangle carrier signal of a triangle modulator 1702 to generate pulse-width modulated control signals $P_1$, $P_2$, $\overline{P_1}$, and $\overline{P_2}$, as is known in the art, and use such triangle carrier signal to trigger a midpoint sampler 1706 configured to sample values of currents $I_1$ and $I_2$ at the midpoint of the "ON" time of a pulse-width modulated control signals $P_1$, $P_2$, as depicted in FIG. 17B. Midpoint sampler 1706 may provide an approximation of cycle average of currents $I_1$ and $I_2$, as described in greater detail below.

Figure 17C:
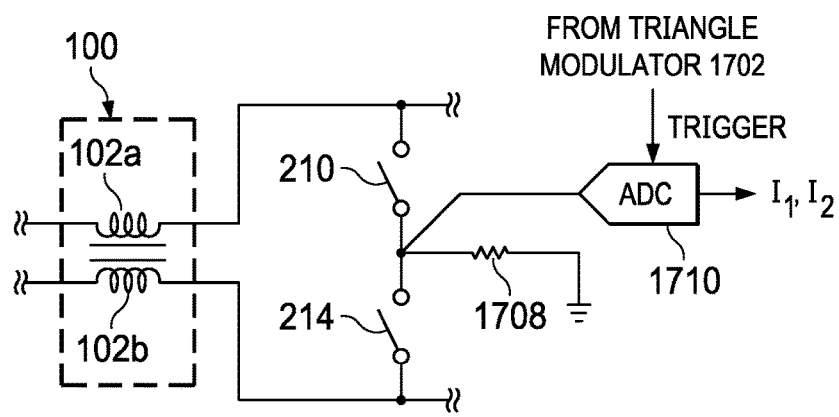
FIG. 17C illustrates a selected portion of a boost converter and selected components of a midpoint sampler, in accordance with embodiments of the present disclosure.

Midpoint sampler 1706 may sample both currents $I_1$ and $I_2$ simultaneously or perform an alternate sampling of currents $I_1$ and $I_2$ as shown in FIG. 17C. FIG. 17C shows a portion of augmented two-stage boost converter 900 in which switches 210 and 214 are controlled by control signals $P_1$ and $P_2$, respectively. In the embodiments represented by FIG. 17C, midpoint sampler 1706 may be implemented by sense resistor 1708 and analog-to-digital converter (ADC) 1710. Sense resistor 1708 may be coupled between a ground voltage and a common node of switches 210 and 214. ADC 1710 may sample a voltage across sense resistor 1708 which may be indicative of a current flowing to ground. Analog-to-digital converter 1710 may be triggered by the trigger signal from triangle modulator 1702 to sample a midpoint current value. Using a single ADC 1710 and sense resistor 1708 may be advantageous because they make up a smaller circuit and the smaller circuit may avoid possible mismatch if two ADCs and sense resistors were to be used.

FIGS. 19A-19C depict various waveforms for a three-cycle simulation of coordination of midpoint sampler 1706 with triangle modulator 1702 and the sampling process of FIG. 17C, in accordance with embodiments of the present disclosure. FIGS. 19A and 19B depict generation of pulse-width modulated control signals $P_1$ and $P_2$ from a triangle carrier wave. FIG. 19A depicts a triangle carrier wave CARRIER with a minimum of −1 and a maximum of +1 and a period equal to a pulse-width modulation period of pulse-width modulated control signals $P_1$ and $P_2$. Reference signals ref1 and ref2 may be related to the desired duty cycles $D_1$ and $D_2$ as follows:

$$\text{ref1} = 2D_1 - 1 \tag{5}$$

$$\text{ref2} = 1 - 2D_2 \tag{6}$$

FIG. 19B depicts pulse-width modulated control signals $P_1$ and $P_2$ which may be derived from reference signals ref1 and ref2 and triangle carrier wave CARRIER as follows:

$$P_1 = \begin{cases} 1, & \text{ref1} > \text{CARRIER} \\ 0, & \text{otherwise} \end{cases} \tag{7}$$

$$P_2 = \begin{cases} 1, & \text{ref2} > \text{CARRIER} \\ 0, & \text{otherwise} \end{cases} \tag{8}$$

Control signals $\overline{P_1}$ and $\overline{P_2}$ may be the logical complements of control signals $P_1$ and $P_2$, respectively.

The alternate sampling of currents $I_1$ and $I_2$ as shown in FIG. 17C may be achieved when triangle carrier wave CARRIER equals −1 and +1, respectively. The times of alternate sampling of currents $I_1$ and $I_2$ are depicted in FIGS. 19A-19C by points labeled $I_1$samp and $I_2$samp, respectively. By sampling at the maximum and minimum of triangle carrier wave CARRIER, sampling is configured to occur at the midpoint of the "ON" time of control signals $P_1$ and $P_2$. Such midpoint sampling may be advantageous as it is maximally far away in time from the edges of control signals $P_1$ and $P_2$ where switching transients may distort measurement. In addition, midpoint sampling may ensure that current $I_1$ is sensed when control signal $P_1$ is asserted and control signal $P_2$ is deasserted and that current $I_2$ is sensed when control signal $P_2$ is asserted and control signal $P_1$ is deasserted, regardless of the desired duty cycles $D_1$ and $D_2$.

Sampling at the midpoint of the PWM waveform has the additional benefit that it may approximate the cycle-average of the inductor currents $I_1$ and $I_2$. FIG. 19C depicts simulated winding currents $I_1$ and $I_2$ assuming lossless inductors and switches, along with the sampled current values. Due to the symmetry of the switching states and the accompanying anti-symmetry of the currents about the midpoint of the control signal "ON" time, the sampled values may represent cycle averages of inductor currents $I_1$ and $I_2$.

Figure 20A:
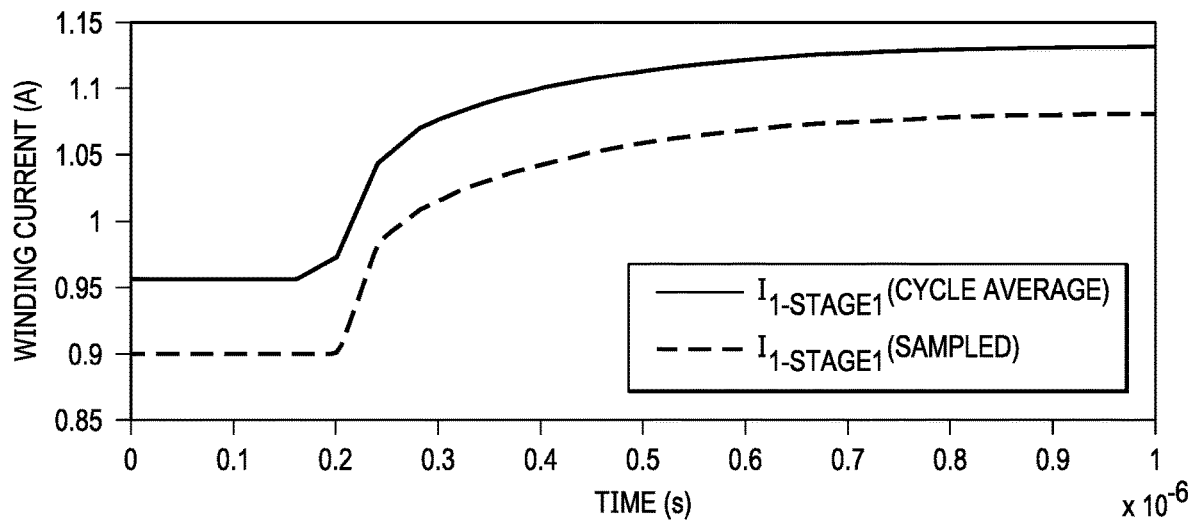
FIGS. 20A and 20B depict waveforms showing an effect of offset caused by resistive losses and imbalance between boost converter stages, in accordance with embodiments of the present disclosure.
Figure 20B:
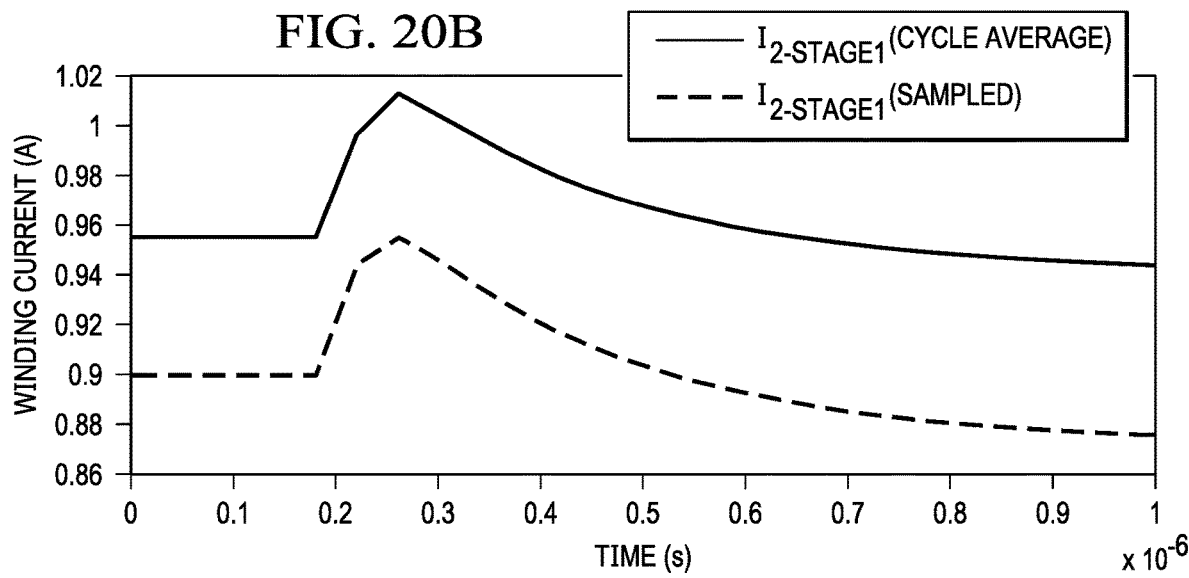

During real operation, resistive losses along with imbalance between two stages 901a and 901b of augmented two-stage boost converter 900 may distort current waveforms such that they are no longer piecewise-linear waveforms that are antisymmetric about the midpoint of the "ON" times of control signals $P_1$ and $P_2$. This distortion may cause an offset between the actual cycle-averages of inductor currents $I_1$ and $I_2$ and the values obtained from mid-point sampling. FIGS. 20A and 20B show an example of this offset from a simulation with resistive losses and imbalance between stages 901a and 901b.

Despite these offset errors, the midpoint-sampled values of inductor currents $I_1$ and $I_2$ may still be used in the current control loop described above. First, the errors are generally small relative to the value being measured. Second, the outer voltage regulation loop may use an integrator to zero out any error in the commanded output current. Third, as the winding current difference approaches zero, the estimated winding current difference from midpoint sampling also approaches zero. Therefore, if estimated coil current difference |I$_1$–I$_2$| is controlled to zero, the actual winding current difference |I$_1$–I$_2$| may also approach zero which may prevent saturation.

2. Applying A Transformation to Current Measurement and Duty Cycle

Figure 21A:
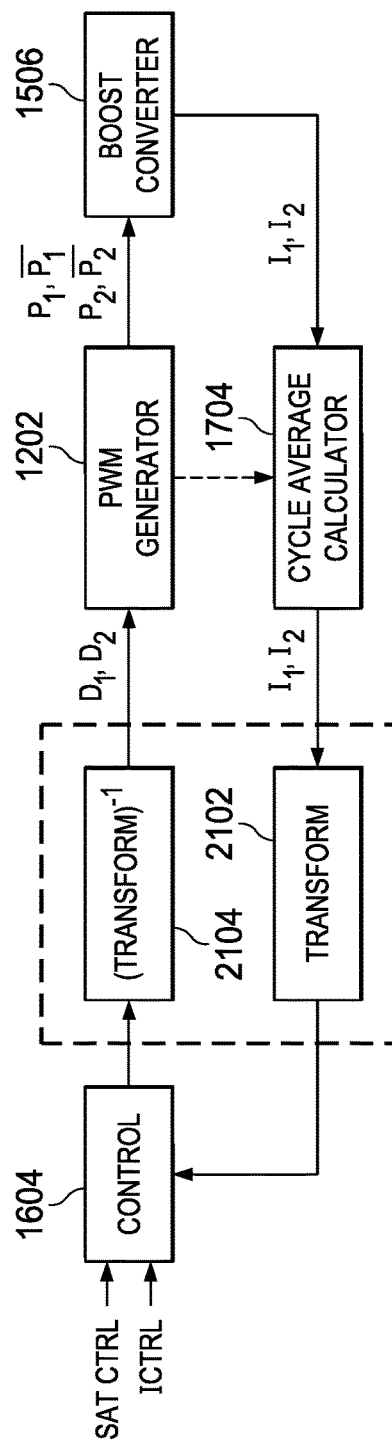
FIGS. 21A and 21B illustrate selected components, including a forward transform block and a reverse transform block, for coordinate transformation, in accordance with embodiments of the present disclosure.

In some embodiments, the control subsystem of boost converter 1506 may implement a coordinate transformation to decouple signals in order to simplify control of boost converter 1506. FIGS. 21A and 21B illustrate selected components, including a forward transform block 2102 and an inverse transform block 2104, for coordinate transformation, in accordance with embodiments of the present disclosure. As shown in FIGS. 21A and 21B, forward transform block 2102 may be applied to measurements for inductor currents I$_1$ and I$_2$ and control block 1604 may operate on transformed measurements I$_m$ and I$_b$ for inductor currents I$_1$ and I$_2$ to generate duty cycle control signals D$_m$ and D$_b$ which may in turn be inverse transformed by inverse transform block 2104 to generate duty cycle control signals D$_1$ and D$_2$ used to drive PWM generator 1202.

Forward transform block 2102 may apply the following transform to generate transformed current measurements I$_m$ and I$_b$:

$$\begin{bmatrix} I_m \\ I_b \end{bmatrix} = \begin{bmatrix} 1 & -1 \\ 1 & 1 \end{bmatrix} \cdot \begin{bmatrix} I_1 \\ I_2 \end{bmatrix} \quad (9)$$

wherein I$_m$ may be referred to as a magnetizing current and I$_b$ may be referred to as a battery current. Magnetizing current I$_m$ may be equal to the difference between inductor currents I$_1$ and I$_2$ and may therefore be proportional to the net magnetic field in the core of multi-wound inductor 100. The term "battery current" as used herein is not in any way limited to a current sourced from a battery but may be sourced from a battery or any suitable power supply or may be a mathematical equivalent/transformative value representative of a battery current or power supply current. For example, battery current I$_b$ may be the sum of coil currents I$_1$ and I$_2$ and for a single stage converter, battery current I$_b$ may be exactly equal to an actual current flowing from the battery or power supply. For a two-stage converter, battery current I$_b$ may no longer be equal to an actual battery or power source current, but may be so termed because it is the same mathematical transformation. Because coil currents I$_1$ and I$_2$ may be the cycle average values of the winding currents, magnetizing current I$_m$ and battery current I$_b$ may also represent the cycle averages of the magnetizing and battery currents.

The inverse transform of transform block 2102 may be applied by inverse transform block 2104 to generate duty cycle control signals:

$$\begin{bmatrix} D_1 \\ D_2 \end{bmatrix} = \frac{1}{2} \begin{bmatrix} 1 & 1 \\ -1 & 1 \end{bmatrix} \cdot \begin{bmatrix} D_m \\ D_b \end{bmatrix} \quad (10)$$

FIG. 21B depicts how both transformations are implemented. In this case, the saturation control signal SATCTRL and the current control signal ICTRL received by control block 1604 may be replaced by a magnetizing current reference Ire, and a battery current reference I$_b^{ref}$, respectively. Because of this transformation, control block 1604 may operate in magnetizing/battery coordinate space rather than a coil 101a/coil 102b coordinate space.

Figure 21C:
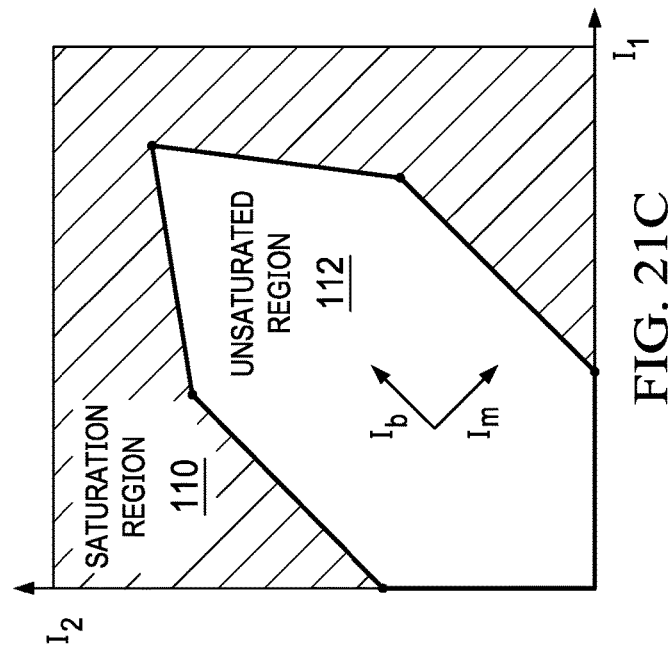
FIG. 21C illustrates a saturation profile of currents within a multi-wound integrated inductor depicting transformed coordinate axes, in accordance with embodiments of the present disclosure.
Figure 21B:
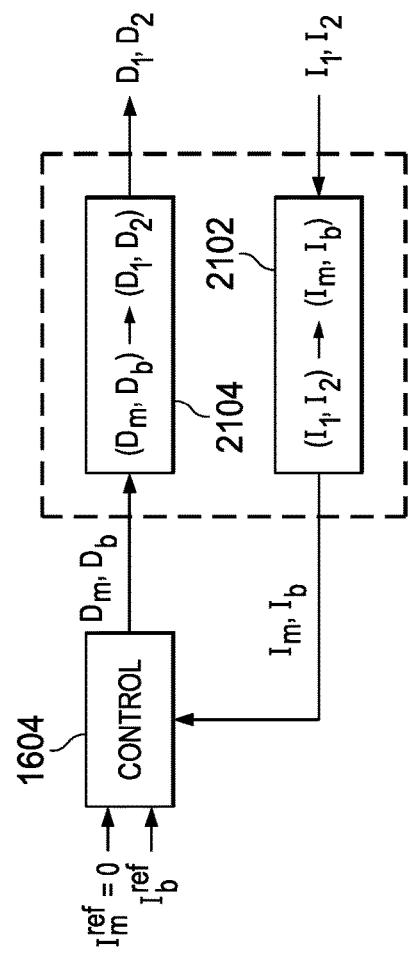

FIG. 21C illustrates a saturation profile of currents within a multi-wound integrated inductor 100 depicting transformed coordinate axes, in accordance with embodiments of the present disclosure. The plot of FIG. 21C depicts a saturation region 110 similar to that of FIG. 1C on a coordinate axis in which current I$_1$ is on the horizontal axis and current I$_2$ is on the vertical axis. The transformation of equation (9) may be interpreted as a rotation transformation that rotates the (I$_1$, I$_2$) axes by 45° to a new set of axes (I$_m$, I$_b$) as shown in FIG. 21C. This rotation transformation may be useful because for most of the unsaturated region 112, the magnetizing current I$_m$ coordinate may be a direct measurement of how far away boost converter 1506 is from exceeding the magnetizing saturation limit I$_{diff}^{sat}$. On the other hand, the orthogonal battery current I$_b$ coordinate is free from this constraint and may be representative of a current flowing through the boost converter 1506 to its output. At large current values, battery current I$_b$ may have a maximum current constraint, but the approximation in the transformed coordinate space may be useful for control over most of the operating space. This example embodiment depicts how the transformation may decouple the saturation protection from output current requirements, allowing each quantity to be controlled independently.

The transformations of equations (9) and (10) may also have the added benefit of decoupling the system modes of the converter. Augmented two-stage boost converter 900 may be modeled using the example state-space averaging technique described in Erickson, Robert W. and Dragan Maksimović, "Fundamentals of Power Electronics: Second Edition," *Springer Science+Business Media*, 2001, which is incorporated herein by reference. Such model may also be linearized about a nominal operating point using a small-signal approximation. Assuming the current dynamics are much faster than the output voltage dynamics, the system including boost converter 1506 and its control subsystem may be modeled as a second-order ordinary differential equation as follows:

$$\begin{bmatrix} L & M \\ -M & L \end{bmatrix} \cdot \frac{d}{dt}\begin{bmatrix} i_1 \\ i_2 \end{bmatrix} = \begin{bmatrix} -\hat{R} & 0 \\ 0 & -\hat{R} \end{bmatrix} \cdot \begin{bmatrix} i_1 \\ i_2 \end{bmatrix} + \begin{bmatrix} \hat{V} & 0 \\ 0 & \hat{V} \end{bmatrix} \cdot \begin{bmatrix} d_1 \\ d_2 \end{bmatrix} \quad (11)$$

where lower case variables i$_1$, i$_2$, d$_1$, and d$_2$ represent the small signal deviations of currents I$_1$ and I$_2$ and duty cycles D$_1$ and D$_2$ from steady-state, L is the self-inductance of inductor 100, M is the mutual inductance of inductor 100, $\hat{R}$ is a resistance which is a function of a switch resistance, inductor resistance, and steady-state duty cycle, and $\hat{V}$ is a voltage that is a function of the power supply voltage, output boost voltage V$_{out}$, switch resistance, inductor resistance, and steady-state current. If the transformations of equations (9) and (10) are applied to equation (11), the result may be:

$$L\begin{bmatrix} 1+k & 0 \\ 0 & 1-k \end{bmatrix} \cdot \frac{d}{dt}\begin{bmatrix} i_m \\ i_b \end{bmatrix} = \begin{bmatrix} -\hat{R} & 0 \\ 0 & -\hat{R} \end{bmatrix} \cdot \begin{bmatrix} i_m \\ i_b \end{bmatrix} + \begin{bmatrix} \hat{V} & 0 \\ 0 & \hat{V} \end{bmatrix} \cdot \begin{bmatrix} d_m \\ d_b \end{bmatrix} \quad (12)$$

where lower case variables i$_m$, i$_b$, d$_m$, and d$_b$ represent the small signal deviations of currents I$_m$ and I$_b$ and duty cycles $D_m$ and $D_b$ from steady-state, and k is a coupling coefficient defined by M/L. In this case, the matrices are diagonalized, such that the magnetizing and battery modes are orthogonal. Thus, the system of boost converter 1506 and its control subsystem may be decoupled into two, independent first-order modes.

Figure 22A:
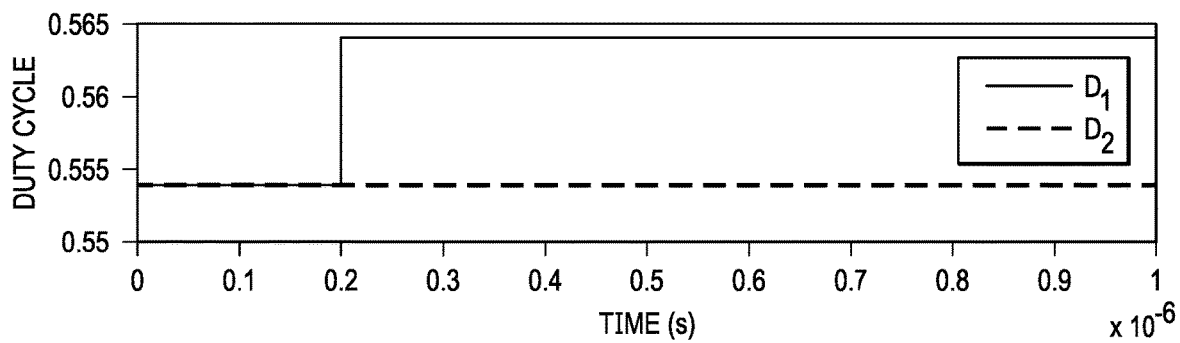
FIGS. 22A-22D depict a simulation of an example step disturbance in the generation of pulse-width modulated control signals and an application of a forward transform to inductor coil currents, in accordance with embodiments of the present disclosure.
Figure 22B:
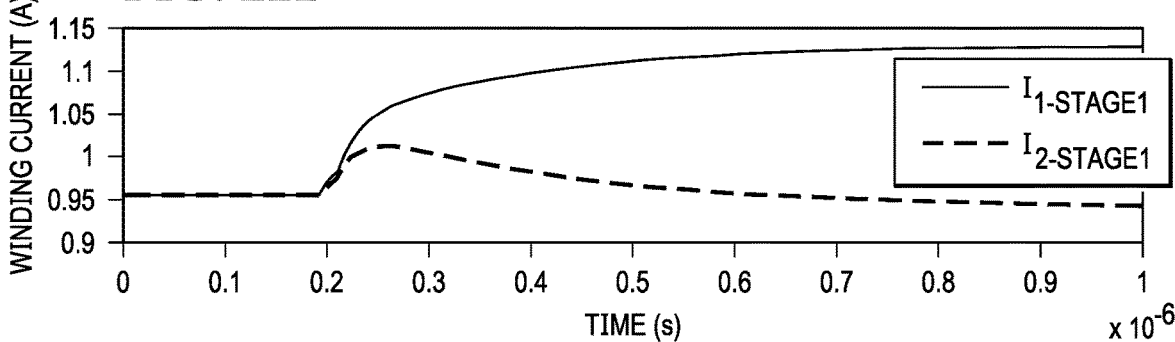
Figure 22C:
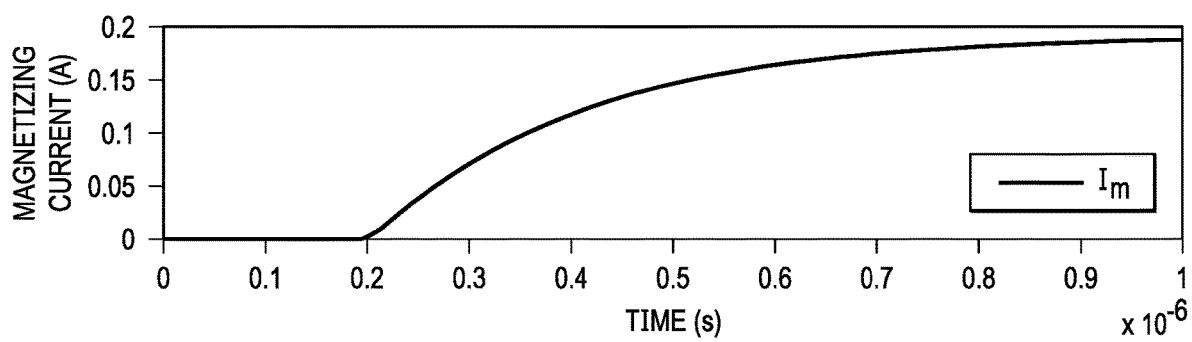
Figure 22D:
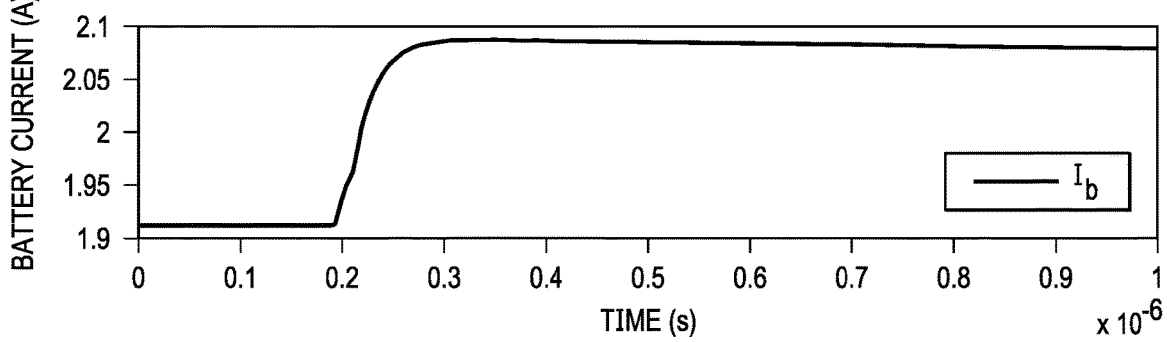

FIGS. 22A-22D depict the results when the foregoing transformation is applied to the previous example of a 1% step disturbance in duty cycle $D_1$. FIG. 22A depicts duty cycle $D_1$ with a disturbance occurring at 0.2 μsec, and FIG. 22B depicts the simulated cycle-average of coil currents $I_1$ and $I_2$ for inductor 100*a*. Even though the disturbance occurs only on duty cycle $D_1$, both currents $I_1$ and $I_2$ may be affected due to the coupled dynamics of equation (11). Transformation equation (9) may be applied to these currents $I_1$ and $I_2$ to yield magnetizing current $I_m$ in FIG. 22C and battery current $I_b$ in FIG. 22D. Currents $I_1$ and $I_2$ may exhibit a second-order response whereas magnetizing current $I_m$ and battery current $I_b$ may exhibit a simple first-order response. These first-order, decoupled dynamics of the magnetizing current $I_m$ and battery current $I_b$ may be easier to control within a control subsystem.

3. Using an Observer for Current Measurement

The cycle-average measurements of currents $I_1$ and $I_2$ may be noisy. Additionally, if the sampling method from FIG. 17C is implemented, information from one of the coils 101 may be missing at each sampling period. These shortcomings may degrade the performance of the control subsystem. Accordingly, the control subsystem may implement an observer 2300, as shown in FIG. 23A. In operation, observer 2300 may receive measured current data $I_{meas}$ and generate an improved estimate of currents $I_1$ and $I_2$. Observer 2300 may use a model of the control subsystem to filter out noise and fill in any missing information. The system model may require knowledge of or information related to the desired duty cycles $D_1$ and $D_2$, as well as an indicator of which current value $I_1$ and $I_2$ is currently being measured. The latter indicator signal is labeled $I_{meas}$ mode in FIG. 23A. Observer 2300 may be implemented using one of several methodologies including, without limitation: a Luenberger filter, a Kalman filter, and a slide mode observer. FIG. 23B shows an implementation based on a Kalman filter. The Kalman filter architecture of FIG. 23B may be used if measured current data $I_{meas}$ comes from the current sampling scheme shown in FIG. 17C. The Kalman filter implementation of FIG. 23B may operate by using a model 2302 and the known model inputs of desired duty cycles $D_1$ and $D_2$ to form an estimate of currents $I_1$ and $I_2$. These estimates may be compared by a subtractor 2304 with measured current data $I_{meas}$ to form error signal e. Error signal e may be multiplied by Kalman gains, K, and then used to adjust the model estimates such that the error is minimized. The signal $I_{meas}$ mode may indicate whether measured current data $I_{meas}$ is measuring current $I_1$ or current $I_2$.

The system model may be derived by discretizing the continuous-time model equation (11) using any standard method (e.g., forward Euler, bilinear transform, Zero Order Hold (ZOH), etc.) and re-writing it in standard form:

$$\begin{bmatrix} i_1 \\ i_2 \end{bmatrix}_{i+1} = A \cdot \begin{bmatrix} i_1 \\ i_2 \end{bmatrix}_i + B \cdot \begin{bmatrix} d_1 \\ d_2 \end{bmatrix}_i \quad (13)$$

Where A and B are 2×2 matrices and I is the sample time index. This model may be extended to include the effects of noise and disturbances on generation of control signals $P_1$ and $P_2$:

$$x_{i+1} = \underbrace{\begin{bmatrix} A & B \\ 0 & I \end{bmatrix}}_{F} x_i + \underbrace{\begin{bmatrix} B \\ 0 \end{bmatrix}}_{G} u_i + w_i \quad (14)$$

$$y_i = H_i x_i + r_i \quad (15)$$

where $x_i=[i_1 \; i_2 \; dist1 \; dist2]_i^T$ is the state vector and dist1 and dist2 are disturbance estimates; $u_i=[d_1 \; d_2 \; 0 \; 0]_i^T$ is the model input vector; F is a 4×4 block matrix comprising the 2×2 matrix A from equation (13), the 2×2 matrix B from equation (13), the 2×2 zero matrix, and the 2×2 identity matrix; G is a 4×2 block matrix comprising 2×2 matrix B and the 2×2 zero matrix, w is a 4×1 vector of the process noise, y is the output $I_1$ or $I_2$; and r is the scalar measurement noise. Matrix $H_i$ may change with time depending on the value of signal $I_{meas}$ mode: if current $I_1$ is being measured, $H_i=[1 \; 0 \; 0 \; 0]$ and if current $I_2$ is being measured, $H_i=[0 \; 1 \; 0 \; 0]$. The dependency of model 2302 on signal $I_{meas}$ mode is represented in FIG. 23B with a dashed line.

The Kalman filter implemented by model 2302 may be implemented in any suitable number of ways using equations (14) and (15) (e.g., in accordance with Simon, Dan, "Optimal State Estimation," Wiley 2006, which is incorporated by reference herein in its entirety). In one possible implementation, the Kalman recursion may be given by:

$$z_i = F x_{i-1}^e + G u_{i-1} \quad (16)$$

$$x_{i-1}^e = z_i + K_i \cdot (y_i - H_i z_i) \quad (17)$$

where $x_{i-1}^e = [i_1^e \; i_2^e \; dist1^e \; dist2^e]_i^T$ is the estimated state vector that contains estimated coil currents and disturbances and $z_i$ is an internal state vector (e.g., an a priori state estimate).

The Kalman gain, $K_i$, may be derived using any of the standard techniques (e.g., techniques disclosed in the Simon reference cited above). However, the gain computation must account for the $H_i$ matrix that changes with time based on measured current data $I_{meas}$. In one implementation, the Kalman gains may be calculated ahead of time over several samples. At steady state, the Kalman gains will alternate between two sets of values depending on signal $I_{meas}$ mode. These steady-state values may be stored and applied depending on the state of signal $I_{meas}$ mode, as indicated by the dashed lines in FIG. 23B.

Figure 24A:
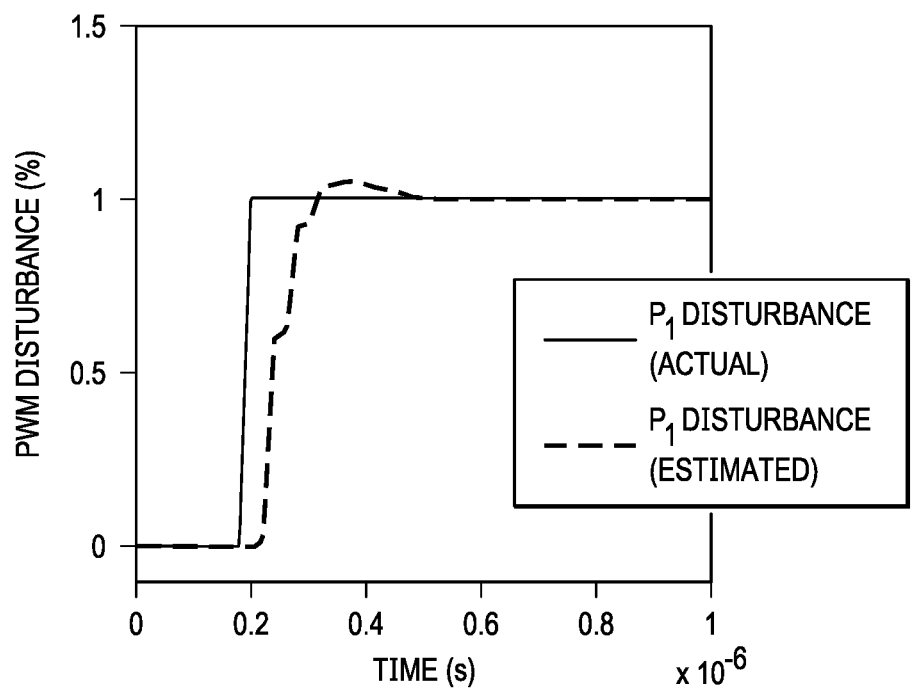
FIGS. 24A-24D depict simulated actual values of pulse-width modulated control signal disturbances and coil currents and estimated versions of such parameters as estimated by the Kalman filter shown in FIG. 23B, in accordance with embodiments of the present disclosure.
Figure 24B:
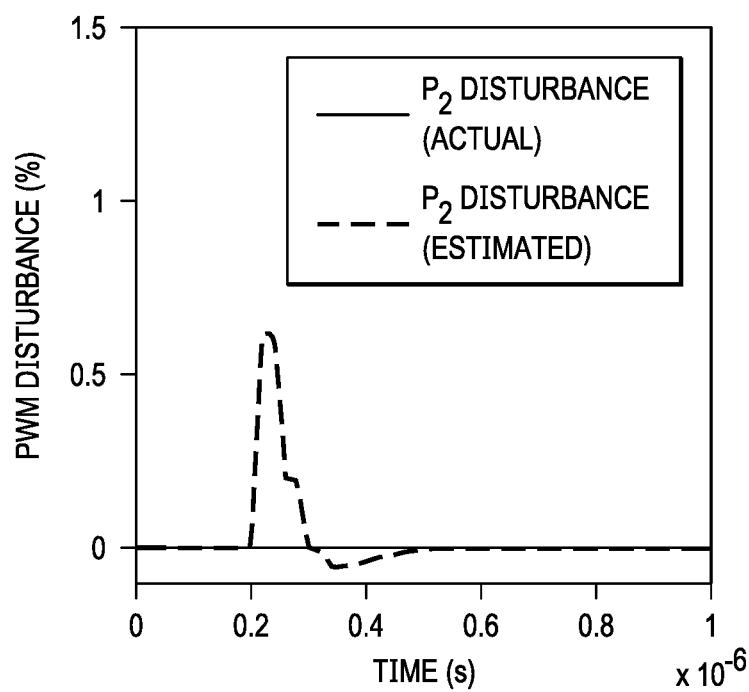
Figure 24C:
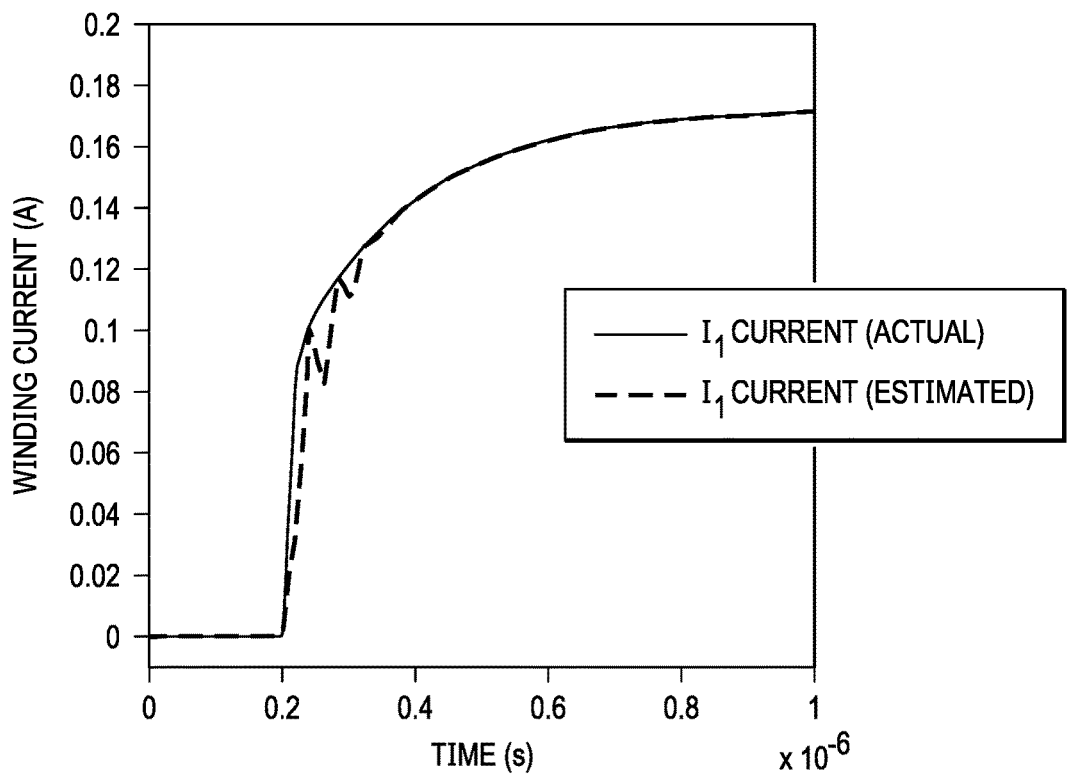
Figure 24D:
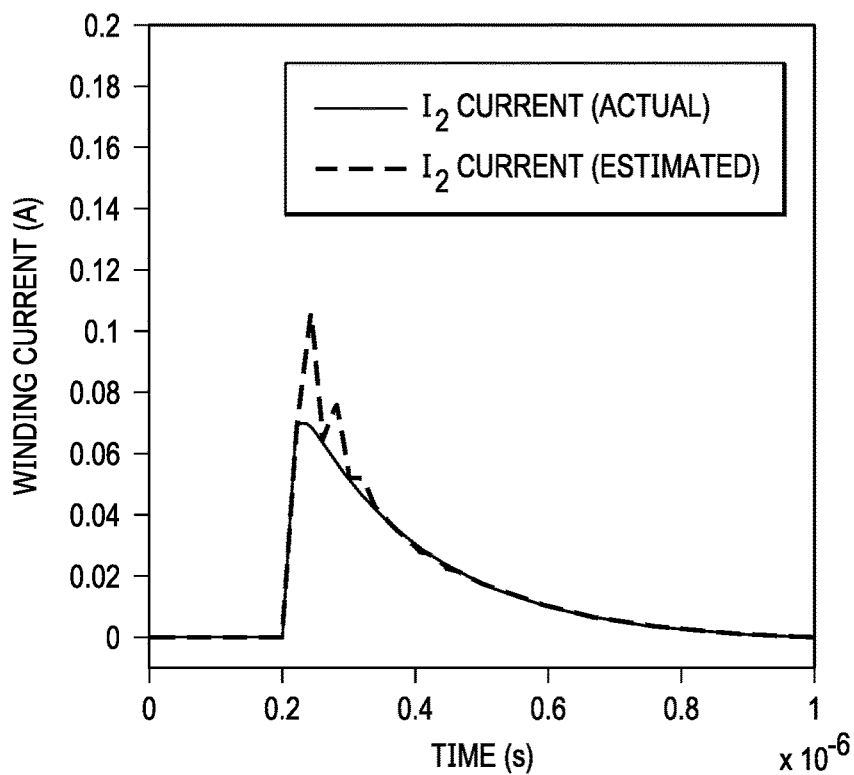

FIGS. 24A-24D depict simulation results of augmented two-stage power converter 900 in response to the 1% step disturbance earlier described. The Kalman filter of FIG. 23B may be used to estimate the currents $I_1$ and $I_2$ as well as the disturbances on control signals $P_1$ and $P_2$. The simulation shown may use the current sampling technique disclosed in FIG. 17C. FIGS. 24A and 24B depict actual and estimated disturbances on control signals $P_1$ and $P_2$ while FIGS. 24C and 24D depict actual and estimated currents $I_1$ and $I_2$. The currents plotted may be the deviations from steady state. The Kalman filter of FIG. 23B may rapidly converge on an estimate of both the disturbances of control signals $P_1$ and $P_2$ and currents $I_1$ and $I_2$ even though the measured value of measured current data $I_{meas}$ only includes one of currents $I_1$ and $I_2$ on each sample.

FIG. 23C depicts an alternative embodiment for observer 2300. In the embodiment of FIG. 23C, two independent observers each with a different model 2302*a* and 2302*b* and gain $K_1$ and $K_2$ may be used. First observer 2300*a* may form an estimate of current $I_1$ when current $I_2$ is being measured. Its input may be the instant measurement of current $I_1$ and the previous measurement of current $I_2$. Likewise, second observer 2300*b* may form an estimate of current $I_2$ when current $I_1$ is being measured. Its input may be the instant measurement of current $I_2$ and the previous measurement of current $I_1$. Unlike the example of FIG. 23B, models 2302*a*, 2302*b* and gains $K_1$, $K_2$ may be fixed. Estimates for current $I_1$, $I_2$ may be taken from either the output of first model 2302*a* or second model 2302*b* depending on the state of signal $I_{meas}$ mode which may control a multiplexed output 2306.

4. Applying Independent Control on Decoupled Current Signals

As shown in FIG. 25A, in some embodiments, currents $I_1$ and $I_2$ may be controlled using two independent control loops with control blocks 1604*a* and 1604*b* that separately control the magnetizing and battery modes. Control blocks 1604*a* and 1604*b* may be implemented using any standard control algorithm including without limitation proportional, proportional-integral, proportional-integral-derivative, or state-space. FIG. 25B depicts an example of a state-space control 2500 that may be used for either or both of control blocks 1604*a* and 1604*b*. State-space control 2500 may implement a servo control architecture that includes an added integrator 2502 to remove steady-state error (e.g., as disclosed in Ogata, Katsuhiko, *Discrete-Time Control Systems*, Prentice Hall, 1995). Such control may be based on a decoupled state-space model of the system. The decoupled model may be derived by applying the magnetizing/battery transform equations (9) and (10) to the discretized model of equation (13):

$$\begin{bmatrix} i_m \\ i_b \end{bmatrix}_{i+1} = \begin{bmatrix} a_m & 0 \\ 0 & a_b \end{bmatrix} \cdot \begin{bmatrix} i_m \\ i_b \end{bmatrix}_i + \begin{bmatrix} b_m & 0 \\ 0 & b_b \end{bmatrix} \cdot \begin{bmatrix} d_m \\ d_b \end{bmatrix}_i \qquad (18)$$

Where $a_m$, $a_b$, $b_m$, and $b_b$ are scalar coefficients. Applying the magnetizing/battery transforms may diagonalize the matrices and decouple the magnetizing/battery modes as discussed earlier. As a result, independent state-space models may be written for each mode. In a real implementation, there may be a non-zero computational delay time for all the blocks of the algorithm. However, in this case, it is assumed there is a one-sample delay between receiving measured current data $I_{meas}$ and calculating the next PWM command. This one-sample delay may also be included in the model for each mode as follows:

$$\begin{bmatrix} up \\ i_m \end{bmatrix}_{i+1} = \begin{bmatrix} 0 & 0 \\ 1 & a_m \end{bmatrix} \cdot \begin{bmatrix} up \\ i_m \end{bmatrix}_i + \begin{bmatrix} b_m \\ 0 \end{bmatrix} d_{m_i} \qquad (19)$$

$$\begin{bmatrix} up \\ i_b \end{bmatrix}_{i+1} = \begin{bmatrix} 0 & 0 \\ 1 & a_b \end{bmatrix} \cdot \begin{bmatrix} up \\ i_b \end{bmatrix}_i + \begin{bmatrix} b_b \\ 0 \end{bmatrix} d_{b_i} \qquad (20)$$

where up is an internal state that represents the input during the previous sample. The models given by equations (18) and (19) may each be used to construct a servo control using a method similar to the Ogata reference cited above. The result may be the architecture in FIG. 25B. The block 2504 labeled "b" may calculate a gain using either the $b_m$ or $b_b$ coefficient from equation (19) or (20) depending on whether the control is for the magnetizing or battery mode. The gains $K_1$, $K_2$, and $K_3$ may be calculated using any standard state-space method (e.g., pole placement, quadratic optimal control, etc.).

The systems and methods described herein may only function successfully when coils 102*a* and 102*b* of a dual-wound inductor 100 having a coupling coefficient k within a particular range. Specifically, a value of k satisfying $0.70 \leq k \leq 0.95$ may be necessary for successful operation. First, for values of k outside such range, an open loop circuit will have winding currents that can either saturate the inductor or have excessively large ripple. Second, for values of k outside this range, a closed-loop system regulating inductor current is difficult to control, impractical to implement, or unstable. Further, it is impractical or expensive to manufacture embedded inductors with coupling coefficients outside this range.

Open-Loop Circuit Behavior

Figure 3A:
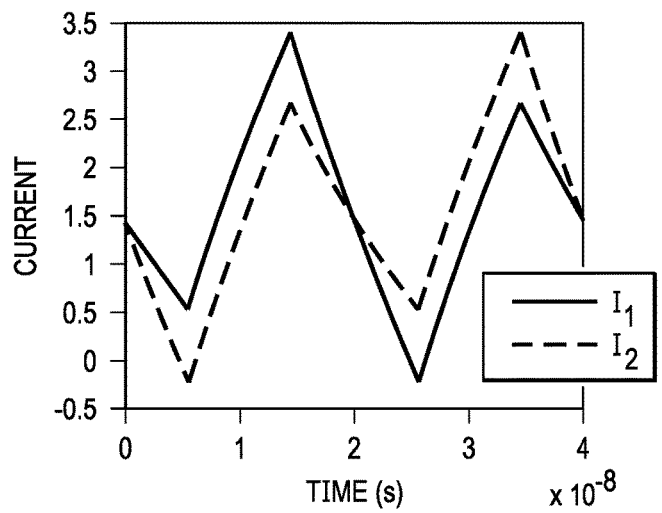
FIG. 3A depicts a circuit simulation of currents for the multi-wound integrated inductor of the single-stage boost converter shown in FIG. 2 over one pulse-width modulation cycle, in accordance with embodiments of the present disclosure.
Figure 3B:
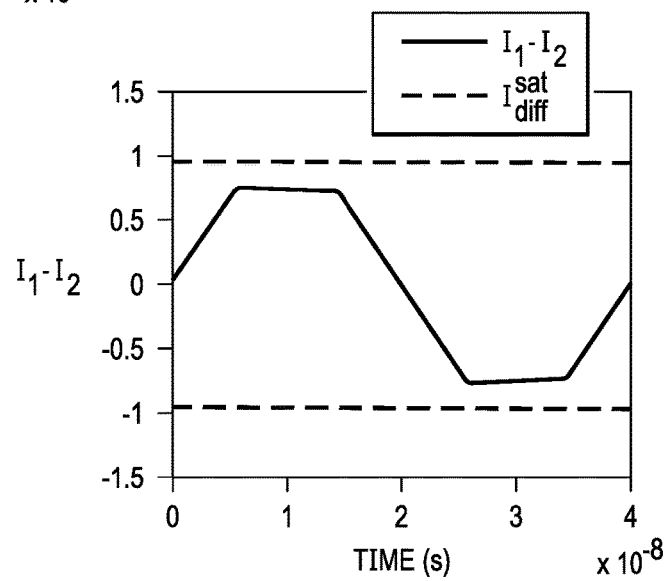
FIG. 3B depicts a circuit simulation of a current difference and a current saturation level for the multi-wound integrated inductor of the single-stage boost converter shown in FIG. 2, in accordance with embodiments of the present disclosure.
Figure 3C:
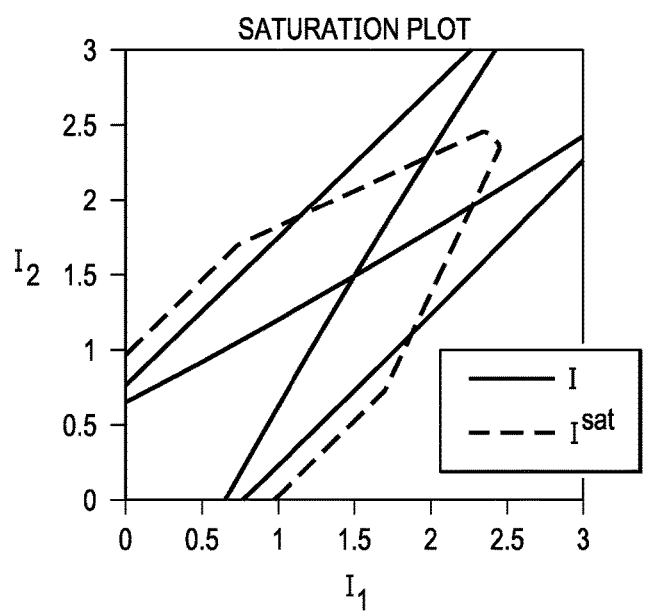
FIG. 3C illustrates a saturation profile of currents within the multi-wound integrated inductor of the single-stage boost converter shown in FIG. 2, in accordance with embodiments of the present disclosure.

Coupling coefficient k must be above a minimum value for the circuits described above to function properly. In the Background and FIGS. 1A-1C it was shown that coupling was necessary for the anti-wound coils 102*a* and 102*b* to cancel the magnetic field in the core and prevent saturation. Specifically, such coupling keeps the difference in winding currents below saturation level $I_{diff}^{sat}$ as shown in FIG. 3B and equation (1). If coupling coefficient k is too low, field cancellation will not occur and condition (1) may be violated.

If the coupling coefficient is too high, a circuit comprising multi-wound inductor 100 will also not function properly. If coupling coefficient k approaches 1, multi-wound inductor 100 will have too much field cancellation when the winding currents of the anti-wound inductor are both rising or falling. For example, as shown in FIGS. 11A and 11B, around times $1 \times 10^{-8}$ seconds and $3 \times 10^{-8}$ seconds, both gate control signals are positive, and all the winding currents are simultaneously rising. As coupling coefficient k approaches 1, the slope of the winding currents in these regions will approach infinity due to the field cancellation. This cancellation may cause high current ripple that can drive inductor 100 into the saturation region, shown in FIG. 1C, and potentially damage the part. High current ripple can also cause excessive heating in external components, generate radiation that violates electromagnetic compatibility (EMC) constraints, and potentially damage a battery supply. Simulations have shown that for a coupling factor k between 0.70 and 0.95, the current ripple is sufficiently small and the inductor winding currents stay in the unsaturated region.

Closed-Loop Circuit Behavior

Maintaining coupling coefficient k below a maximum limit is also important for closed-loop control that regulates electrical current through inductor 100. A linearized model of voltage control loop 1500 was given in Equation (12) using the magnetizing and battery currents as state variables. Because the state variables are decoupled, the equations can be rearranged as two, independent, first-order ordinary differential equations:

$$\frac{di_m}{dt} = -\frac{\hat{R}}{L \cdot (1+k)} i_m + \frac{\hat{V}}{L \cdot (1+k)} \cdot d_m \qquad (21)$$

$$\frac{di_b}{dt} = -\frac{\hat{R}}{L \cdot (1-k)} i_b + \frac{\hat{V}}{L \cdot (1-k)} \cdot d_b \qquad (22)$$

In this form, it is clear that if coupling coefficient k approaches 1, the denominator of both coefficients in Equation (22), representing battery current $i_b$, may become very large. Such large coefficients in battery current Equation (22) may be highly problematic for control. If k=1, then the coefficients in battery current Equation (22) are infinite and the closed-loop system of voltage control loop 1500 becomes unstable and uncontrollable. However, even if coupling coefficient k approaches 1, the closed-loop system of voltage control loop 1500 is difficult or impractical to control. As the coefficient $$\frac{\hat{V}}{L \cdot (1-k)}$$

increases, the gain between the input signal $d_b$ and the rate of range of current $i_b$ may become large. In a practical implementation of a circuit having voltage control loop 1500, this extremely large gain may lead to undesirable amplification of noise from the input (e.g., discretization noise) as well as lead to impractical demands for high-resolution control that can be costly. It can also cause large signal swings on the currents that may saturate feedback sensors.

In addition, as the coefficient $$\frac{\hat{R}}{L \cdot (1-k)}$$

increase, the eigenvalue of Equation (22) may become large and current $i_b$ may have a very fast response. Systems with fast dynamics often require fast control circuitry which can be both costly to implement and use large amounts of power, which decreases overall system efficiency. The fast response time of such a plant also means that it may be more sensitive to delays in the control loop, which also makes the control system design more challenging.

Simulations performed by the Applicant have shown that constraining k≤0.95 maintains the coefficients of Equation (22) small enough that a control circuit for voltage control loop 1500 may be practically implemented.

Integrated, Dual-Inductor Manufacturability

Figure 1A:
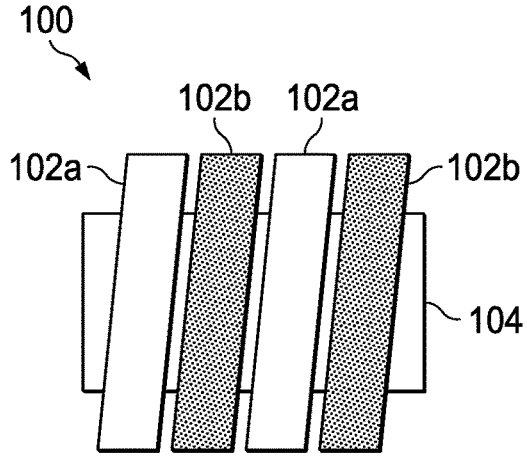
FIGS. 1A and 1B depict a multi-wound integrated inductor, in accordance with embodiments of the present disclosure.
Figure 1B:
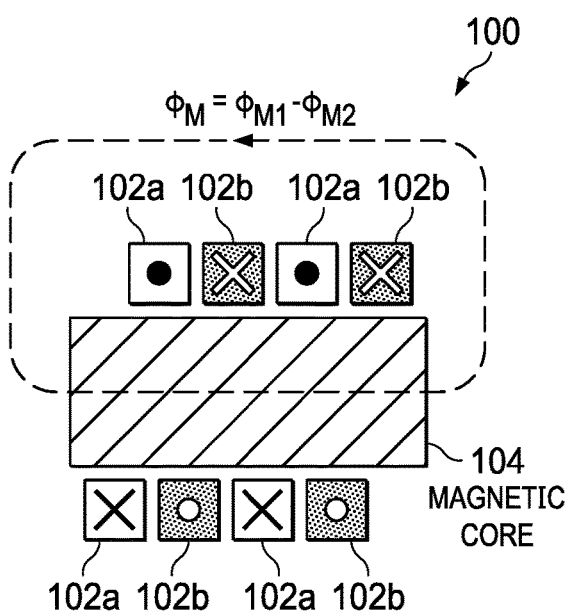
Figure 1C:
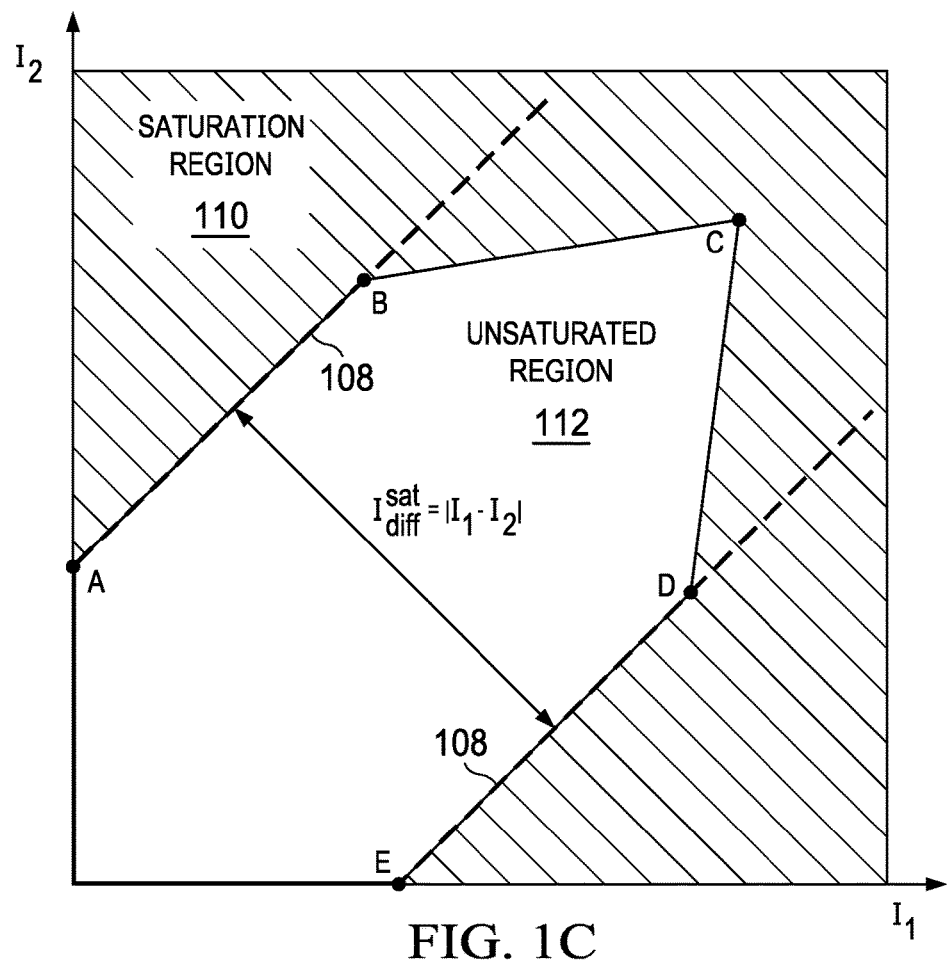
FIG. 1C illustrates a saturation profile of currents within the multi-wound integrated inductor shown in FIGS. 1A and 1B, in accordance with embodiments of the present disclosure.

Selecting a coupling coefficient k may also be important to keep manufacturing costs of the integrated, dual-inductor 100 to a minimum as well as enable successful integration into a target application. Coupling between coils 102a and 102b may be achieved by interleaving coils 102a and 102b as shown in FIGS. 1A-1B. Coupling coefficient k may be controlled by adjusting the number of turns of each coil 102a and 102b that are interleaved and the spacing between coils. If coupling coefficient k is low, it means the two coils 102 and 102b may need to be further apart, which may increase the size and cost of a device.

A coupling coefficient k that is too large is also impractical to manufacture. Even with all the turns of both coils 102a and 102b fully interleaved, coupling coefficient k will reach a maximum value less than 1. Finite element simulations have shown such maximum value to be around 0.95. This maximum value is because only some of the magnetic flux generated by a coil 102a/102b flows through the core and links the adjacent coil 102a/102b. This linking is especially true for the end turns where there is less core material. Further increase in coupling coefficient k may be possible by adding more core material around the windings, but such approach may become very costly and impractical to manufacture. In addition, the wiring to the coil structure, both internal to an integrated circuit chip and external to the chip, may have its own self-inductance. This factor alone may prevent a coupling coefficient k greater than 0.99.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A system, comprising:
   a power converter comprising at least one stage having a dual anti-wound inductor having a first winding and a second winding constructed such that its windings generate opposing magnetic fields in its magnetic core and constructed such that a coupling coefficient between the first winding and the second winding is less than approximately 0.95; and a current control subsystem for controlling an electrical current through the dual anti-wound inductor, the current control subsystem configured to:

minimize a magnitude of a magnetizing electrical current of the dual anti-wound inductor to prevent core saturation of the dual anti-wound inductor; and regulate an amount of output electrical current delivered by the power converter to the load in accordance with a reference input signal.

2. The system of claim 1, wherein the power converter is a boost converter.

3. The system of claim 1, wherein the reference input signal is a reference voltage indicating a desired voltage level to be driven to the load.

4. The system of claim 1, wherein the current control subsystem is further configured to control the magnetizing electrical current and the output electrical current independently from one another.

5. The system of claim 1, wherein the current control subsystem is further configured to, in order to minimize the magnitude of the magnetizing electrical current to prevent core saturation of the dual anti-wound inductor and regulate the amount of output electrical current, transform electrical current parameters from a first coordinate space defined by a first electrical current through a first winding of the dual anti-wound inductor and a second electrical current through a second winding of the dual anti-wound inductor to a second coordinate space defined by the magnetizing electrical current and the output electrical current.

6. The system of claim 1, wherein the current control subsystem comprises an observer configured to improve accuracy of a measurement of a first electrical current through a first winding of the dual anti-wound inductor and a second electrical current through a second winding of the dual anti-wound inductor by estimating the first electrical current when the first electrical current is out of phase for measurement and by estimating the second electrical current when the second electrical current is out of phase for measurement.

7. The system of claim 1, wherein the current control subsystem comprises a current control loop for control of the power converter, and is further configured to measure, as feedback parameters to the current control loop:

a first average current of a first winding of the dual anti-wound inductor over the duration of a pulse-width modulation period of the first winding; and a second average current of a second winding of the dual anti-wound inductor over the duration of a pulse-width modulation period of the second winding.

8. The system of claim 1, wherein the first winding and the second winding are constructed such that the coupling coefficient is greater than approximately 0.70.

9. A method for controlling an electrical current through a dual anti-wound inductor integral to a power converter, the dual anti-wound inductor having a first winding and a second winding constructed such that its windings generate opposing magnetic fields in its magnetic core and constructed such that a coupling coefficient between the first winding and the second winding is less than approximately 0.95, the method comprising:

minimizing a magnitude of a magnetizing electrical current of the dual anti-wound inductor to prevent core saturation of the dual anti-wound inductor; and regulating an amount of output electrical current delivered by the power converter to the load in accordance with a reference input signal.

10. The method of claim 9, wherein the power converter is a boost converter.

11. The method of claim 9, wherein the reference input signal is a reference voltage indicating a desired voltage level to be driven to the load.

12. The method of claim 9, further comprising controlling the magnetizing electrical current and the output electrical current independently from one another.

13. The method of claim 9, further comprising, in order to minimize the magnitude of the magnetizing electrical current to prevent core saturation of the dual anti-wound inductor and regulate the amount of output electrical current, transforming electrical current parameters from a first coordinate space defined by a first electrical current through a first winding of the dual anti-wound inductor and a second electrical current through a second winding of the dual anti-wound inductor to a second coordinate space defined by the magnetizing electrical current and the output electrical current.

14. The method of claim 9, further comprising implementing an observer configured to improve accuracy of a measurement of a first electrical current through a first winding of the dual anti-wound inductor and a second electrical current through a second winding of the dual anti-wound inductor by estimating the first electrical current when the first electrical current is out of phase for measurement and by estimating the second electrical current when the second electrical current is out of phase for measurement.

15. The method of claim 9, further comprising implementing a current control loop for control of the power converter, and is further configured to measure, as feedback parameters to the current control loop:

a first average current of a first winding of the dual anti-wound inductor over the duration of a pulse-width modulation period of the first winding; and a second average current of a second winding of the dual anti-wound inductor over the duration of a pulse-width modulation period of the second winding.

16. The method of claim 9, wherein the first winding and the second winding are constructed such that the coupling coefficient is greater than approximately 0.70.

17. A system for controlling an electrical current through a dual anti-wound inductor integral to a power converter, the dual anti-wound inductor having a first winding and a second winding constructed such that its windings generate opposing magnetic fields in its magnetic core and constructed such that a coupling coefficient between the first winding and the second winding is less than approximately 0.95, the system comprising:

an input for receiving a reference input signal; and a current control subsystem configured to:

minimize a magnitude of a magnetizing electrical current of the dual anti-wound inductor to prevent core saturation of the dual anti-wound inductor; and regulate an amount of output electrical current delivered by the power converter to the load in accordance with the reference input signal.

18. The system of claim 17, wherein the power converter is a boost converter.

19. The system of claim 17, wherein the reference input signal is a reference voltage indicating a desired voltage level to be driven to the load.

20. The system of claim 17, wherein the current control subsystem is further configured to control the magnetizing electrical current and the output electrical current independently from one another.

21. The system of claim 17, wherein the current control subsystem is further configured to, in order to minimize the magnitude of the magnetizing electrical current to prevent core saturation of the dual anti-wound inductor and regulate the amount of output electrical current, transform electrical current parameters from a first coordinate space defined by a first electrical current through a first winding of the dual anti-wound inductor and a second electrical current through a second winding of the dual anti-wound inductor to a second coordinate space defined by the magnetizing electrical current and the output electrical current.

22. The system of claim 17, wherein the current control subsystem comprises an observer configured to improve accuracy of a measurement of a first electrical current through a first winding of the dual anti-wound inductor and a second electrical current through a second winding of the dual anti-wound inductor by estimating the first electrical current when the first electrical current is out of phase for measurement and by estimating the second electrical current when the second electrical current is out of phase for measurement.

23. The system of claim 17, wherein the current control subsystem comprises a current control loop for control of the power converter, and is further configured to measure, as feedback parameters to the current control loop:
- a first average current of a first winding of the dual anti-wound inductor over the duration of a pulse-width modulation period of the first winding; and
- a second average current of a second winding of the dual anti-wound inductor over the duration of a pulse-width modulation period of the second winding.

24. The system of claim 17, wherein the first winding and the second winding are constructed such that the coupling coefficient is greater than approximately 0.70.

* * * * *